(12) United States Patent
Friedmann et al.

(10) Patent No.: US 6,223,053 B1
(45) Date of Patent: *Apr. 24, 2001

(54) UNIVERSAL RADIO FOR USE IN VARIOUS CELLULAR COMMUNICATION SYSTEMS

(75) Inventors: James J. Friedmann, Canton; Nainesh P. Shah, Parma, both of OH (US)

(73) Assignee: Cisco Systems, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,622

(22) Filed: Jun. 26, 1996

(51) Int. Cl.$^7$ ........................................ H04B 1/36
(52) U.S. Cl. ...................... 455/552; 455/575; 375/131
(58) Field of Search ................... 455/423, 550, 455/552, 553, 426, 575, 78, 84, 85, 86, 115; 375/216, 200, 201, 202, 206, 269, 273, 302, 322, 323, 130, 131, 140

(56) References Cited

U.S. PATENT DOCUMENTS

| | | | |
|---|---|---|---|
| 5,210,770 | * | 5/1993 | Rice ...................................... 375/200 |
| 5,228,074 | * | 7/1993 | Mizikovsky .......................... 455/553 |
| 5,425,051 | | 6/1995 | Mahany . |
| 5,450,616 | | 9/1995 | Rom . |
| 5,459,759 | * | 10/1995 | Schilling ............................... 375/202 |
| 5,493,693 | * | 2/1996 | Tanaka et al. ........................ 455/553 |
| 5,548,825 | * | 8/1996 | Meamura ............................. 455/115 |
| 5,550,895 | * | 8/1996 | Burson et al. ........................ 455/552 |
| 5,628,055 | * | 5/1997 | Stein ....................................... 455/90 |
| 5,648,985 | * | 7/1997 | Bjerede et al. ....................... 375/273 |
| 5,732,330 | * | 3/1998 | Anderson et al. ..................... 455/84 |
| 5,815,525 | * | 9/1998 | Smith et al. .......................... 455/553 |

FOREIGN PATENT DOCUMENTS

| | | |
|---|---|---|
| 0579372 | 1/1994 | (EP) . |
| 406132847 | * 5/1994 | (JP) ...................................... 455/78 |

* cited by examiner

Primary Examiner—Thanh Cong Le
(74) Attorney, Agent, or Firm—Arter & Hadden LLP

(57) ABSTRACT

A universal radio having adjustable communication parameters such that the radio can communicate in different DS or FH type systems as well as DS-FH hybrid type systems which employ both DS and FH spread spectrum techniques. The radio is included in a mobile terminal and/or base station and can be adjusted by the user to employ communication parameters relating to various different cellular communication systems. Thus, the mobile terminal and/or base station can be used in combination with the cellular communication systems provided by different manufacturers.

13 Claims, 15 Drawing Sheets

| SYSTEM — 102 | MODULATION TYPE — 104 | DATA ↔ SYMBOL — 106 | FREQUENCY RANGE, CARRIER FREQUENCY — 108 | HOPPING SEQUENCE — 110 | DIRECT SEQUENCE PN CODE — 112 | DATA RATE (Mbit/sec) — 114 |
|---|---|---|---|---|---|---|
| ... | ... | ... | ... | ... | ... | ... |
| ABC MODEL III | BPSK | PATTERN 1 | 800-870 MHz | SET 1, PATTERN 3 | 0000 | FHrate 3 |
| ABC MODEL IV | QPSK | PATTERN 3 | 2.4-2.48 GHz | SET 3, PATTERN 21 | DSEQUENCE 15 | FHrate 6, DSrate 2 |
| ACME SYS I | FSK | PATTERN 26 | 902-928 MHz, $f_{c1}$ | 00000 | DSEQUENCE 4 | DSrate 7 |
| ACME SYS II | BPSK | PATTERN 3 | 800-870 MHz | 00000 | DSEQUENCE 3 | DSrate 3 |
| TELXON B | SPM | PATTERN 6 | 2.4-2.48 GHz, $f_{c2}$ | SET 2, PATTERN 6 | DSEQUENCE 10 | FHrate 9, DSrate 1 |
| ... | ... | | | | | ... |
| | | | | | | |
| ZIPPER 800 | ... | | | | | ... |

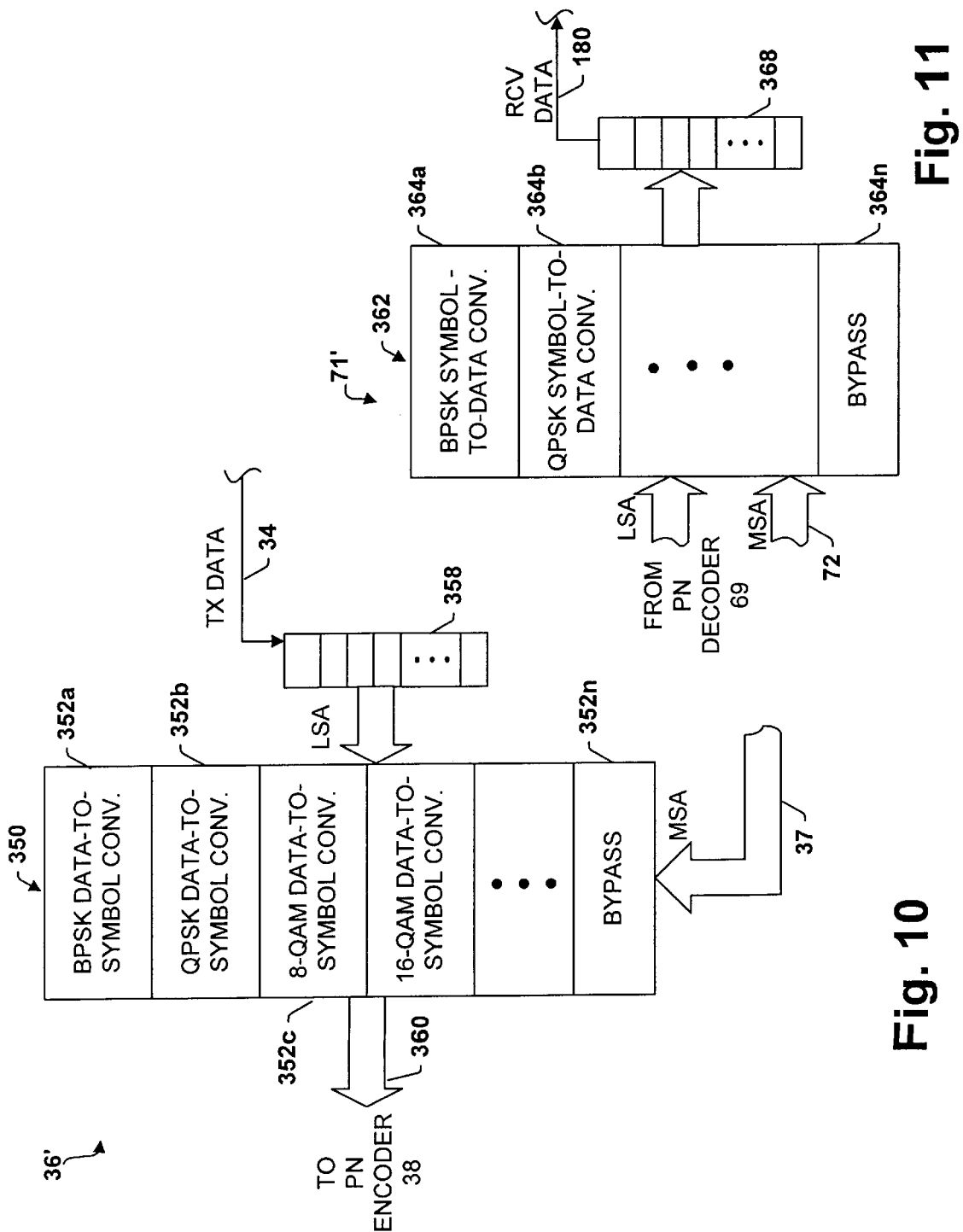

UNIVERSAL RADIO FOR USE IN VARIOUS CELLULAR COMMUNICATION SYSTEMS

TECHNICAL FIELD

The present invention relates generally to a universal radio, and more particularly to an adjustable radio which can operate according to different parameters corresponding to various cellular communication systems.

BACKGROUND OF THE INVENTION

In recent years, the use of cellular communication systems having mobile terminals which communicate with a hardwired network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products, defects, etc.

A typical cellular communication system includes a number of fixed base stations or access points interconnected by a cable medium often referred to as a system backbone. Also included in many cellular communication systems are intermediate base stations which are not directly connected to the system backbone. Intermediate base stations, often referred to as wireless base stations or repeaters, increase the area within which base stations connected to the system backbone can communicate with mobile terminals. Unless otherwise indicated, the term "base station" will hereinafter refer to both base stations hardwired to the network and wireless base stations.

Associated with each base station is a geographic cell. A cell is a geographic area in which a base station has sufficient signal strength to transmit data to and receive data from a mobile terminal with an acceptable error rate. Typically, base stations will be positioned along the backbone such that the combined cell area coverage from each base station provides full coverage of a building or site.

Cellular communication systems such as those described above often involve spread spectrum (SS) technology. An SS communication system is one in which the transmitted frequency spectrum or bandwidth is much wider than absolutely necessary. Generally, SS technology is utilized for communications in the unlicensed bands provided by the FCC for low power communication devices. These bands include the 902–928 MHz and 2.4–2.48 GHz ranges in the U.S. The FCC requires that information transmitted in these bands be spread and coded in order to allow multiple user access to these bands at the same time.

The two most popular spreading methods in spread spectrum systems are referred to as frequency hopping (FH) and direct sequence (DS) spreading. In FH systems, the radio transmitter hops from one carrier frequency channel to another at a specific hopping rate and in a specific sequence that appears to be a random pattern. This pattern is often referred to as a pseudo-random hop sequence. FH systems offer the advantage of high noise avoidance due to the continuous hopping among different frequencies, otherwise referred to as frequency channels. For instance, a noise signal associated with a particular frequency will interfere with a FH modulated waveform only when the FH modulated waveform is sent on a channel which encompasses the frequency of the noise. Since FH systems will typically hop through a large number of channels (e.g., 75 or more), the noise interference will be limited to only every 75 or more hops.

Direct sequence (DS) systems differ from FH systems in that they do not hop among different frequency channels. Rather, DS systems broaden the overall bandwidth of their transmissions by artificially increasing the data bit rate.

More specifically, direct sequence transmissions involve dividing each data bit to be transmitted into a plurality of sub-bits, commonly referred to as "chips". Each data bit is typically divided into ten or more chips, and the apparent data rate and resultant bandwidth are increased proportionally. The process of dividing each data bit into smaller sub-bits is generally referred to as chipping and is based on a predetermined spreading code known as a PN code or PN sequence. Although DS systems do not typically have as high a noise tolerance as FH systems, the DS systems do have advantages related to its ability to transmit data over channels having larger bandwidths. More specifically, the larger bandwidth generally allows for higher rate of data transmissions as compared to FH systems.

Conventional spread spectrum radios typically are configured to handle either frequency hopping or direct sequence communications. FH radios ordinarily cannot communicate with DS radios and vice versa. Moreover, two or more radios which are each DS radios or FH radios cannot necessarily communicate with each other unless they are operating using the same complete set of communication parameters. For example, two DS radios each using different PN codes cannot communicate with one another since neither radio would be able to properly decode incoming signals received from the other radio.

As competition increases among manufacturers of cellular communication equipment, so does the number of different cellular communication systems and radios which are available in the marketplace. Unfortunately, the different systems utilize different FH and/or DS communication parameters resulting in a lack of compatibility among systems. Thus, users of a particular system typically are required to purchase all of their base stations and mobile terminals from the same manufacturer in order to ensure compatibility. Users are unable to shop comparatively from different manufacturers and select those mobile terminals and/or base stations which best suit their needs regardless of the particular system in which they are to be utilized and the specific communication parameters used therein.

Some mobile terminals offer increased versatility by including two or more different radios rather than a single radio. For example, one radio in the mobile terminal is utilized to obtain information from a local area network and another radio is used to transmit this information to a wide area network. Unfortunately, mobile terminals having two or more radios are often more expensive, larger in size, and heavier in weight.

In view of the aforementioned shortcomings associated with conventional radios used in cellular communication systems, there is a strong need in the art for a radio which is compatible with a large number of cellular communication systems. More specifically, there is a strong need in the art for a universal radio which is user adjustable in order to operate in accordance with the communication parameters of different systems. In addition, there is a strong need in the art for a radio which does not require two or more individual radios in order to communicate with other radios in multiple networks.

SUMMARY OF THE INVENTION

A universal radio is provided having adjustable communication parameters such that the radio can communicate in different systems including DS or FH type systems, DS-FH hybrid type systems which employ both DS and FH spread spectrum techniques, micro-radios, etc. The radio is included in a mobile terminal and/or base station and can be adjusted by the user to employ communication parameters relating to various different cellular communication systems. Thus, the mobile terminal and/or base station can be used in combination with the cellular communication systems provided by different manufacturers. In addition, the mobile terminal or base station may be configured to provide optimum performance. For example, if an area is particularly noisy each mobile terminal and base station can be configured to use an FH spreading technique. In a less noisy environment, a DS spreading technique can be used in order to provide higher data throughput.

Each radio has stored in memory the communication parameters utilized in a variety of known cellular communication systems on the market. Such communication parameters may include PN code, modulation type (e.g., BPSK, QPSK, MSK, FSK, etc.), FH hopping sequence, frequency band, etc. A user may configure the radio to access any of the parameters through a number of different methods. For example, the user may scroll through a menu on a display of a mobile terminal and select the particular system parameters required. Alternatively, information related to system communication parameters can be encoded in a bar code which is read by a mobile terminal. Base stations having an adjustable radio therein can be configured via a control message provided from the host computer or other network device via the system backbone.

Furthermore, the radio is able to reconfigure its communication parameters on the fly. As a result, the radio can function as two or more radios at substantially the same time without actually requiring two or more radios. For example, a single radio can communicate with a wide area network operating in the 806–870 MHz range and a local area network operating in a 2.4–2.48 GHz range at substantially the same time.

According to one particular aspect of the invention, a cellular communication device is provided which includes an adjustable radio which transmits and receives cellular communication radio signals based on a selected set of communication parameters, and an input for allowing a user to select the set of communication parameters from among a plurality of different sets of communication parameters, wherein the adjustable radio is adjustable via the selected set of communication parameters with respect to at least one of modulation technique, frequency hopping sequence and PN coding.

According to another aspect of the invention, a cellular communication device is provided which includes an adjustable radio which transmits and receives cellular communication radio signals based on a selected set of communication parameters and a control circuit for automatically selecting the set of communication parameters from among a plurality of different sets of communication parameters based on the signals received by the adjustable radio.

In accordance with a further aspect of the invention, a cellular communication system is provided which includes a network, a host computer coupled to the network, and a plurality of base stations coupled to the network and communicating with the host computer. Each base station includes a base station transceiver for transmitting and receiving wireless communications and a plurality of mobile terminals for communicating with the network by way of at least one of the plurality of base station. Each of the plurality of mobile terminals has a mobile terminal transceiver for transmitting and receiving wireless communications with respect to the at least one of the plurality of base station. In addition, the transceiver of at least one of the mobile terminals or base stations includes an adjustable radio which transmits and receives cellular communication radio signals based on a selected set of communication parameters, and an input which allows a user to select the set of communication parameters from among a plurality of different sets of communication parameters, wherein the adjustable radio is adjustable via the selected set of communication parameters with respect to at least one of modulation technique, frequency hopping sequence and PN coding.

According to yet another aspect of the invention, a cellular communication system is provided which includes a network, a host computer coupled to the network, and a plurality of base stations coupled to the network and communicating with the host computer. Each of the base stations includes a base station transceiver for transmitting and receiving wireless communications and a plurality of mobile terminals for communicating with the network by way of at least one of the plurality of base stations. Each of the plurality of mobile terminals has a mobile terminal transceiver for transmitting and receiving wireless communications with respect to the at least one of the plurality of base stations. The transceiver of at least one of the mobile terminals or base stations includes an adjustable radio which transmits and receives cellular communication radio signals based on a selected set of communication parameters, and a control circuit for automatically selecting the set of communication parameters from among a plurality of different sets of communication parameters based on the signals received by the adjustable radio.

According to still another aspect of the invention, a mobile terminal bar code device is provided. The device includes a bar code reader for reading bar code information, an adjustable radio operatively coupled to the bar code reader which transmits and receives cellular communication radio signals based on a selected set of communication parameters, at least a portion of the cellular communication radio signals including information based on the bar code information read by the bar code reader, and an input for allowing a user to select the set of communication parameters from among a plurality of different sets of communication parameters.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3 represents a look-up table stored in memory in the adjustable radio, such look-up table including a list of communication parameters for various different cellular communication systems;

FIG. 10 is a block diagram of the data-to-symbol converter circuit included in the adjustable modulation portion according to the second embodiment of the present invention;

FIG. 11 is a block diagram of the symbol-to-data converter circuit included in the adjustable demodulation portion according to the second embodiment of the present invention;

DESCRIPTION OF THE PREFERRED EMBODIMENTS

Figure 1:
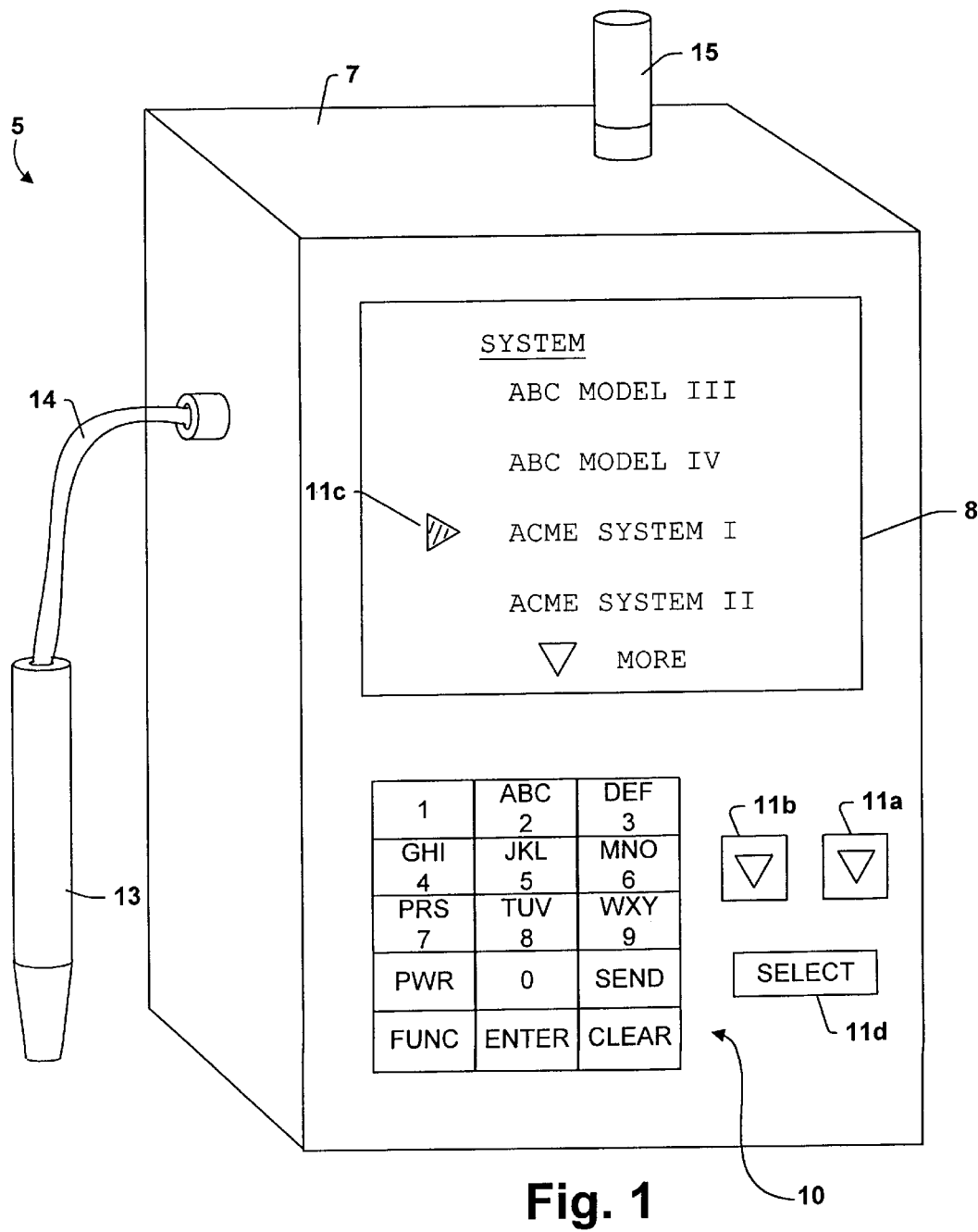
FIG. 1 is a perspective view of a mobile terminal including an adjustable radio in accordance with the present invention.

The present invention will now be described with reference to the drawings, wherein like reference numerals are used to refer to like elements throughout.

Referring initially to FIG. 1, a mobile terminal 5 is shown which includes an adjustable radio 6 (FIG. 2) in accordance with the present invention. As is discussed more fully below, a user is able to adjust the communication parameters of the radio 6 based, for example, on the particular cellular communication system in which the mobile terminal will be used. Consequently, the same mobile terminal 5 can be utilized in a variety of different cellular communication systems so as to obviate the need to purchase different radios for different systems. Similarly, the adjustable radio 6 can be incorporated into a base station as discussed below in connection with FIG. 16. In this manner, the base station itself is also adjustable so as to eliminate the need to buy different base stations for use in different cellular communication systems.

Various other features and aspects of the invention will become more apparent in view of the following discussion.

Continuing to refer to FIG. 1, the mobile terminal 5 includes a portable housing 7 which houses the adjustable radio 6 and is made of metal, high strength plastic, or the like. The mobile terminal 5 includes a display 8 such as a liquid crystal display or the like. As is conventional, the display 8 functions to display data or other information relating to ordinary operation of the mobile terminal 5 in a given cellular communication system. For example, the display 8 may display inventory information, pricing details, etc. which is to be transmitted to or is received from the system backbone via a base station.

Furthermore, the display 8 is used in a configuration mode to display a menu which lists different cellular communication systems for which the communication parameters are stored in the mobile terminal 5. As is described below, a user is able to select one or more of the cellular communication systems shown on the display 8. In response, the radio 6 retrieves from memory the communications parameters associated with the selected cellular communication system (s) and configures itself to operate in accordance with such parameters. The storage of such communication parameters is discussed in more detail below in association with FIG. 3.

The mobile terminal 5 further includes a keypad 10 which enables a user to enter data, information, function commands, etc. as is conventional. For example, the user may input information relating to inventory via the keypad 10 for subsequent transmission to a base station. In addition, the keypad 10 includes up and down cursor keys 11a and 11b, respectively, for controlling a cursor 11c which is shown on the display 8 during the configuration mode. By selectively pressing the up and down cursor keys 11a and 11b, the user is able to scroll through the menu of different communication systems shown on the display 8. For example, the cursor 11c in the exemplary embodiment moves up and down the left side of the menu. When the cursor 11c is adjacent to the name of the particular cellular communication system for which it is desired that the radio 6 configure itself for, the user depresses a select key 11d. As described below, the radio 6 is programmed to detect such selection and to retrieve from memory the communication parameters corresponding to the selected communication system. The radio 6 then reconfigures itself to operate according to such communication parameters.

The mobile terminal 5 also includes a bar code reader 13 in the form of a wand or the like which allows information to be input to the mobile terminal 5 via bar code symbols. Such information can then be transmitted from the mobile terminal 5 to a system backbone via a base station. The bar code reader 13 is coupled to the housing 7 by a cable 14 which provides the appropriate electrical connections between the bar code reader 13 and the circuitry contained in the housing 7. In a preferred embodiment, the user may select a cellular communication system included in the menu by using the bar code reader 13 in the configuration mode to scan a bar code label corresponding to an entry in the menu.

Extending from the housing 7 is an antenna 15 used by the radio 6 for transmitting and receiving radio signals within the cellular communication system. In the exemplary embodiment, the antenna 15 is an omnidirectional antenna but other types of antennas are equally possible.

Figure 2:
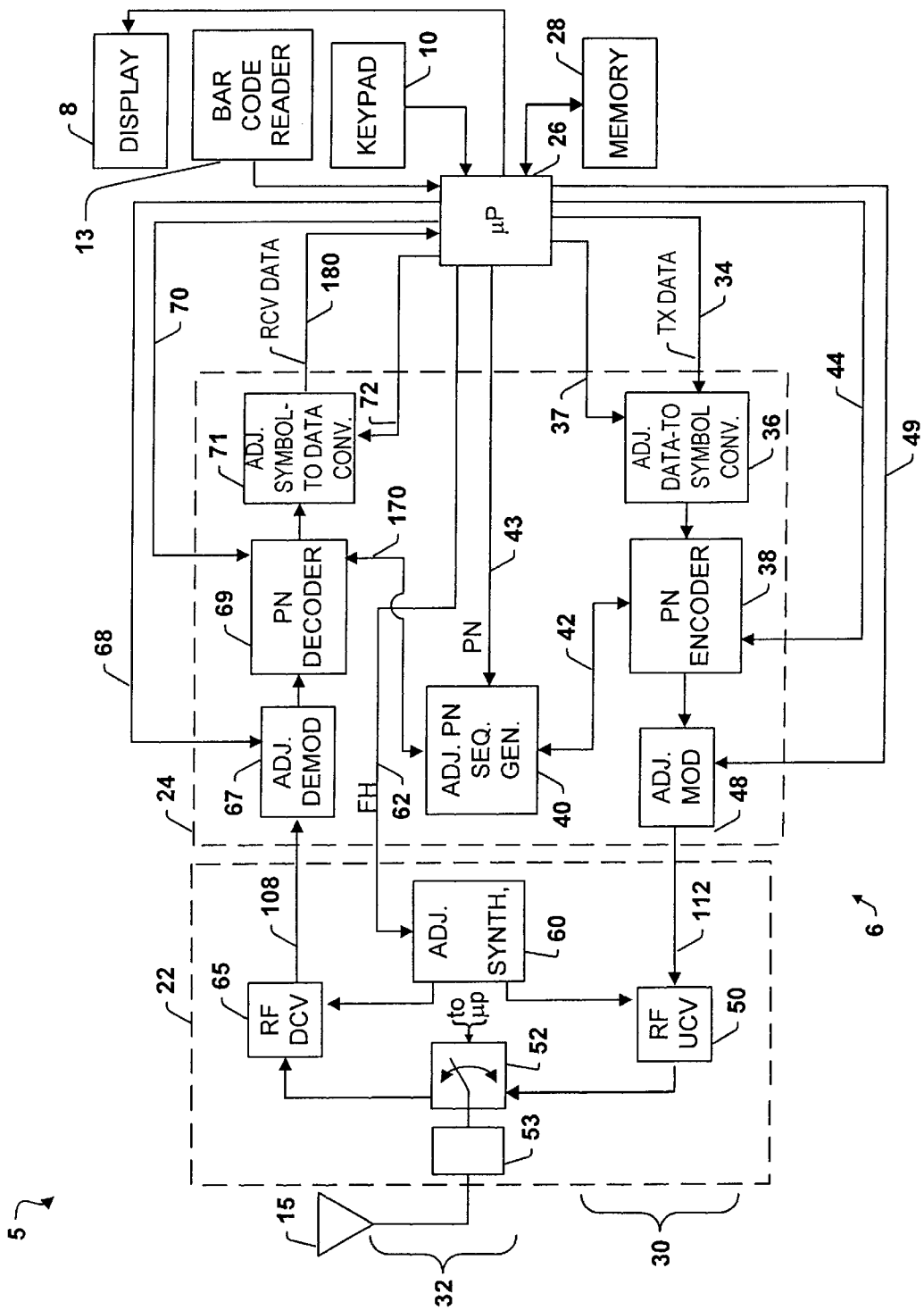
FIG. 2 is a block diagram of the adjustable radio in accordance with the present invention.

Referring now to FIG. 2, a block diagram of the mobile terminal 5 is shown. According to the exemplary embodiment, the radio 6 included within the mobile terminal 5 is adjustable to function as either a direct sequence (DS), frequency hopping (FH), or a DS/FH hybrid type system. Specifically, communication parameters such as the PN code sequence, frequency hopping sequence, modulation scheme, etc. are adjustable by the user so as to be compatible with the particular cellular communication system in which the mobile terminal 5 will be utilized.

The radio 6 includes an adjustable radio frequency (RF) section 22 and an adjustable modulation section 24. In addition, the radio 6 includes a microprocessor 26 for controlling the operation of the RF section 22 and the modulation section 24 as described more fully below. The microprocessor 26 also functions to perform various operations involved in the processing of data transmitted and received by the radio 6. These operations include such items as processing data packets, data manipulation, data storage, etc. The specific operations of the radio 6 are dependent on the particular application as will be appreciated.

A memory 28 including both volatile and non-volatile memory is included in the radio 6 and can serve as a location data storage. The memory 28 also stores therein a preprogrammed look-up table including a listing of the known relevant communication parameters for various different cellular communication systems included in the aforementioned menu as discussed below in connection with FIG. 3. Thus, when a user selects a particular cellular communication system the microprocessor 26 accesses the look-up table in the memory 28 to identify the particular communication parameters associated with the selected communication system. The memory 26 stores the particular communication parameter details regarding each communication system, such details including for example the particular PN sequence and/or FH sequence employed, the modulation type, the data rate, the frequency band, etc. The processor 26 utilizes such details relating to the communication parameters for the selected communication system to provide control signals to the adjustable RF section 22 and modulation section 24. As discussed more fully in connection with FIGS. 511, the processor 26 thereby configures the radio 6 to communicate using the communication parameters of the selected communication system.

In addition, the memory 28 stores other appropriate operating code to be executed by the microprocessor 26 for carrying out the functions described herein. The manner in which the microprocessor 26 can be programmed to carry out the various functions will be readily apparent to those having ordinary skill in the art based on the description provided herein. Accordingly, additional detail as to the specific programming code has been omitted.

The radio 6 may be partitioned into a transmitter section 30 and a receiver section 32. When transmitting information, the microprocessor 26 provides serial binary data to be transmitted on line 34 to an adjustable data-to-symbol converter 36 which converts the data to a sequence of symbols. The converter 36 is adjustable by the microprocessor 26 via a control line 37 based on a user input as discussed below. For example, the converter 36 can be configured to operate according to a four-point quadrature mapping scheme. In such case, each pair of data bits received in sequence from the microprocessor 26 is converted into one of four different symbols represented by respective I and Q values as is conventional. The symbol data which is output by the converter 36 is input to a PN encoder circuit 38 which spreads the symbol data using a PN spreading sequence provided by an adjustable PN sequence generator 40. Specifically, the PN sequence generator 40 provides a PN sequence to the PN encoder circuit 38 via line 42. The PN sequence is preselected to divide each symbol data provided by the converter 36 into N chips, where N equals the number of bits in the PN sequence. In the preferred embodiment, the PN sequence generator 40 is programmable such that the microprocessor 26 can program the PN sequence generator 40 via line 43 to provide a desired PN sequence. As is discussed in more detail below, the microprocessor 26 selects the particular PN sequence based on a user input. In cases where the data is to be transmitted without DS modulation, the PN encoder 38 is disabled by the microprocessor 26 via a control line 44 such that the PN encoder 38 simply outputs the symbol data without performing any PN encoding.

The symbol data from the PN encoder 38 is input serially into an adjustable modulator 48. As described more fully below in connection with FIGS. 5–6, the adjustable modulator 48 can be adjusted to employ any one of several different known modulation techniques such as BPSK, QPSK, OQPSK, FSK, MSK, GFSK, GMSK. In addition, for example, the adjustable modulator 48 can carry out what is referred to as sinusoidal phase modulation (SPM) as disclosed in copending U.S. patent application Ser. No. 08/616,254 for a "Sinusoidal Phase Modulation Method and System", filed on Mar. 15, 1996. The entire disclosure of U.S. Ser. No. 08/616,254 is incorporated herein by reference. The adjustable modulator 48 is configured to employ a particular modulation technique selected from the different available modulation techniques based on a control signal provided by the microprocessor 26 via line 49 in response to a user input. As a result, the PN coded data from the PN encoder 38 is modulated by the adjustable modulator 48 according to the selected modulation technique.

A signal carrying the modulated data is output from the adjustable modulator 48 via line 112 and is input to an RF upconverter circuit 50 which filters and mixes the output from the modulator 48 up to the desired RF carrier frequency. The output of the RF upconverter circuit 50 is provided to the transmit terminal of an antenna switch 52. When the antenna switch 52 is in a transmit position, the modulated RF signal from the RF upconverter circuit 50 is coupled to the antenna 15 through filter 53 and is used to transmit the signal. Alternatively, when the antenna switch 52 is in a receive position, signals received by the antenna 15 are fed through the filter 53 to the receiver section 32 of the radio 6 as discussed below. The antenna switch 52 can be any type of suitable switch for switching the antenna 54 between a transmitting mode and a receiving mode. For example, the antenna switch 52 can be a PIN-diode based single pole-double throw (SPDT) switch as is known. A switch control line (not shown) couples the antenna switch 52 to the microprocessor 26 to allow the microprocessor 26 to control whether the antenna 15 is in the transmitting mode or the receiving mode. The filter 53 may be a high pass, low pass or band pass filter, for example, capable of passing signals falling within a given frequency range. Alternatively, the antenna 15 may couple with the antenna switch 52 through a bank of filters similar to that described above with reference to FIG. 12, in the event the radio 6 is to support systems communications in more than one frequency band.

The antenna 15 can be any of a variety of types of antennas as mentioned above. For example, the antenna 15 may be an omni, yagi or other type antenna depending on the particular gain/direction requirements.

As is discussed below in more detail in relation to the embodiment of FIG. 7, the RF upconverter circuit 50 is driven in part by an adjustable synthesizer 60.

The adjustable synthesizer 60 provides appropriate sinusoidal RF carrier frequency signals to the RF upconverter circuit 50 such that the modulated RF carrier signal either is fixed at a selected carrier frequency or hops between different FH channels in accordance with system requirements for a selected FH system. By outputting a fixed RF carrier frequency or a sequence of different carrier frequencies which are mixed with the output of the adjustable modulator 48, the modulated RF signal will remain at a desired frequency (for DS systems) or hop in accordance with a desired frequency hopping sequence (for FH or FH/DS systems). The output frequency of the adjustable synthesizer 60 is controlled by the microprocessor 26 via line 62 based on a user input. Similar to selecting a PN code sequence and modulation technique, the radio 6 allows the user to select a particular DS carrier frequency or FH sequence by way of the adjustable synthesizer 60.

Describing now the receiver section 32 of the radio 6, a signal is received by the radio 6 via the antenna 15 with the antenna switch 52 in the receive position. Specifically, the signal received by the antenna 15 is coupled via the receive terminal of the antenna switch 52 to the input of an RF downconverter circuit 65. The RF downconverter circuit 65 is driven by the same adjustable synthesizer 60 so as to mix down the received signal by applying the same selected fixed frequency or frequency hopping sequence. The RF downconverter circuit 65 mixes the received signal down to a lower frequency and outputs the mixed down signal via line 108 to an adjustable demodulator 67. Similar to the adjustable modulator 48, the adjustable demodulator 67 can be adjusted to employ any one of several different known demodulation techniques such as BPSK, QPSK, OQPSK, FSK, MAK, GFSK, GMSK, AM, FM. Likewise, the adjustable demodulator 67 can carry out what is referred to as sinusoidal phase modulation (SPM) demodulation as disclosed in U.S. patent application Ser. No. 08/616,254.

The particular demodulation technique employed by the adjustable demodulator 67 is controlled by the microprocessor 26 via line 68 based on a user input as is discussed in more detail below. Generally speaking, the modulator 48 and demodulator 67 are configured so as to simultaneously carry out the same form of modulation/demodulation (e.g., BPSK, QPSK, etc.) based on the particular system parameters requested by the user.

The demodulated signal which is output from the adjustable demodulator 67 is then input to an PN decoder 69 which despreads the received signal according to the PN sequence provided by the adjustable PN sequence generator 40. The PN sequence generator 40 provides to the PN decoder 69 the same PN sequence provided to the PN encoder 38 based on the user input so that the radio 6 can both receive and transmit DS signals. As with the PN encoder 38, in the event PN encoding is not used by the radio 6 in a particular configuration, the PN decoder 69 is disabled by the microprocessor 26 via a control line 70. As a result, the data from the adjustable demodulator 67 passes directly through the PN decoder 69 without any decoding function.

The output of the PN decoder 69 is provided to an adjustable symbol-to-data converter 71 which converts the received symbol data into binary data. The binary data is provided from the converter 71 to the microprocessor 26 for appropriate processing, manipulation, storage, etc., depending on the particular application. Similar to the adjustable data-to-symbol converter 36, the symbol-to-data converter 71 is adjustable by the microprocessor 26 via a control line 72 based on a user input as discussed below. For example, the converter 71 can be configured to operate according to the same four-point quadrature mapping scheme as the converter 36. In such case, each symbol received from the PN decoder 69 is converted into a sequence of two data bits which are provided to the microprocessor 26.

Turning now to FIG. 3, a parameter look-up table 100 is shown including a listing of communication parameters for various different cellular communication systems. The contents of such look-up table 100 are stored in a non-volatile portion of the memory 28. In operation, the radio 6 of the present invention is capable of variably adjusting its communication parameters to handle a variety of FH, DS and hybrid type systems such as those found in various commercially available cellular communication systems. As shown in FIG. 3, communication parameters for each of several different systems are stored in the parameter table 100. The parameter table 100 contains several fields the contents of which may either be preprogrammed into the memory 28 or entered via one of several external input modes. For instance, a mobile terminal 5 may be configured to accept entry of such parameters through the keypad 10 (FIG. 2), the bar code reader 13, an external communication port (not shown), etc.

The various fields included in the parameter table 100 may or may not be relevant to a particular system. The fields, as shown, include a system name field 102 which stores the name of the system as referred to by a user or a manufacturer, for example. Associated with each system name 102 are several fields which define the communication parameters utilized by the particular system. In particular, a modulation field 104 indicates the particular modulation technique utilized by the system (e.g., BPSK, QPSK, FSK, SPM, etc.). A data↔symbol field 106 indicates the particular data-to-symbol/symbol-to-data conversion which is performed on data which is transmitted/received by the radio 6. Such conversion is identified nominally by a predefined I-Q constellation plane pattern, for example. Such conversion may involve the different constellation plane patterns typically associated with BPSK, QPSK, 8-QAM, 16-QAM, 32-QAM, etc., the particular conversion being consistent with the modulation technique represented in the modulation field 104. The particular arrangement of each constellation plane pattern is not critical to the invention, and hence further detail is omitted.

The parameter table 100 further includes a frequency range field 108 which is used, for example, to identify the frequency band in which the particular system operates. In the event a system utilizes a specific carrier frequency, the particular carrier frequency is also included in the frequency range field 108. Thus, for example, if a particular system included in the table 100 is a DS system which does not employ frequency hopping, the frequency range field 108 will also include the specific RF carrier frequency for the system. The adjustable synthesizer 60 is designed using conventional techniques so as to be able to output an RF carrier signal in accordance with the frequencies included in the table 100. For example, the adjustable synthesizer 60 may include a voltage-controlled oscillator (VCO) and digital-to-analog converter (DIA) (not shown) for receiving digital data from the microprocessor 26 via line 62 and converting the digital data to an analog voltage which controls the output frequency of the synthesizer 60.

The parameter table 100 also includes a hopping sequence field 110 which stores the particular FH sequence employed by those respective systems utilizing frequency hopping. Each FH sequence consists of a sequence of carrier frequencies provided to the adjustable synthesizer 60 to cause the radio 6 to hop in frequency in accordance with conventional techniques. The particular hopping sequences are identified nominally in the table 100 by set number and pattern number provided in the hopping sequence field 100. The hopping sequence itself may be stored in another portion of the memory 28 which can be indexed by the set number and pattern number. A typical system will offer three different sets from which to choose and approximately 26 different patterns in each set. Alternatively, the hopping sequence itself can be stored in the hopping sequence field 110. In systems not using a frequency hopping scheme, there is no set or pattern number and instead the field is filled with zeros, for example, to indicate to the microprocessor 26 that the system does not utilize frequency hopping.

Also included in the table 100 is a direct sequence PN code field 112 which identifies the PN sequence utilized in the DS modulation of the particular system. The different PN sequences are identified nominally in the table 100 as dsequence1, dsequence2, etc. As with the hopping sequence 110, each PN sequence in field 112 can be the sequence itself or merely an identifier which serves as an index to another location in the memory 28 at which the entire sequence is stored. In either case, for those systems employing DS modulation the information in field 112 is utilized by the microprocessor 26 to configure the adjustable PN sequence generator 40 (FIG. 2). Specifically, the microprocessor 26 provides the particular sequence from the memory 28 to the generator 40 via line 43. The generator 40 in turn provides the PN sequence to the PN encoder 38 and PN decoder 69 which encode/decode the transmitted/received data using conventional techniques based on the PN sequence.

If PN coding is not utilized (e.g., in a non-DS system), a series of zeros are placed in the PN code field 112 which are recognized by the microprocessor 26 to indicate that PN coding is not utilized for the particular system. It is noted that the length of the PN code field 112 along with the length of the other fields in the table 100 are sufficient to store the longest codes, etc. expected to be stored therein. For example, the length of the PN sequence may vary from system to system so the PN code field 112 is designed to be long enough to handle larger sized PN codes when necessary.

A data rate field 114 includes information regarding the precise data rate at which data is transmitted in the particular system. In a system employing frequency hopping, the data rate field 114 includes an indication of the hop rate (FHrate) of the system. In a system employing DS spreading, the data rate field 114 includes an indication of the chip rate (DSrate) of the PN sequence. Such information is used by the microprocessor 26 to adjust the rate of the various clocks and sampling rates within the radio 6 to achieve the particular data rate at which data is to be transmitted and received. Such adjustability can be provided via a combination of one or more system clocks with programmable divide-by-N counters as is known. The details regarding the adjustment of various clock and sampling rates will be apparent to those having ordinary skill in the art, and hence additional detail is omitted.

In addition to the fields 102–114 shown in the parameter table 100, the microprocessor 26 may also append various additional parameters to each particular system identified in the system field 102. Such additional parameters may include timing information, packet field formats and/or fields relevant to other communication parameters of a particular system. Depending on the sophistication level of the microprocessor 26, more fields could be added in the table 100 to allow more specialized communication parameters to also be entered and stored.

There are a variety of ways in which a user can instruct the radio 6 to configure itself according to the various parameters stored in the parameter table 19 100. For example, the microprocessor 26 is programmed to display on the display 8 a list of the systems identified in the system field 102 as shown in FIG. 1. The microprocessor 26 displays such list in response to a predefined set of key operations on the keypad 10, for example. The user inputs such predefined set of key operations when desiring to place the radio 6 into a configuration mode and to select parameters relating to a new system. The microprocessor 26 is also programmed to move the cursor 11c through the list in response to the up and down cursor keys 11a and 11b. When the user depresses the select key 11d, the microprocessor 26 is programmed to access the parameters stored in the parameter table 100 for the particular system identified by the cursor 11c.

Alternatively, when the radio 6 is in the configuration mode, the user may use the bar code reader 13 to read a bar code (not shown) indicative of one of the particular systems stored in the parameter table 100. The microprocessor 26 is programmed to decode the information from the bar code and match it to a system in field 102 of the parameter table 100. The microprocessor 26 then retrieves the various parameter information associated with the thus selected system. In yet another embodiment, the user may enter the name of the particular system using the alpha characters on the keypad 10. The microprocessor 26 may be programmed to receive the characters entered via the keypad 10 during the configuration mode and to decode the inputted information to obtain a match among the systems identified in parameter table 100. Such decoding of the alpha characters can be carried out using techniques conventionally used in many voice mail systems which allow a user to enter the name of a party to which the user wishes to leave a message.

Figure 4:
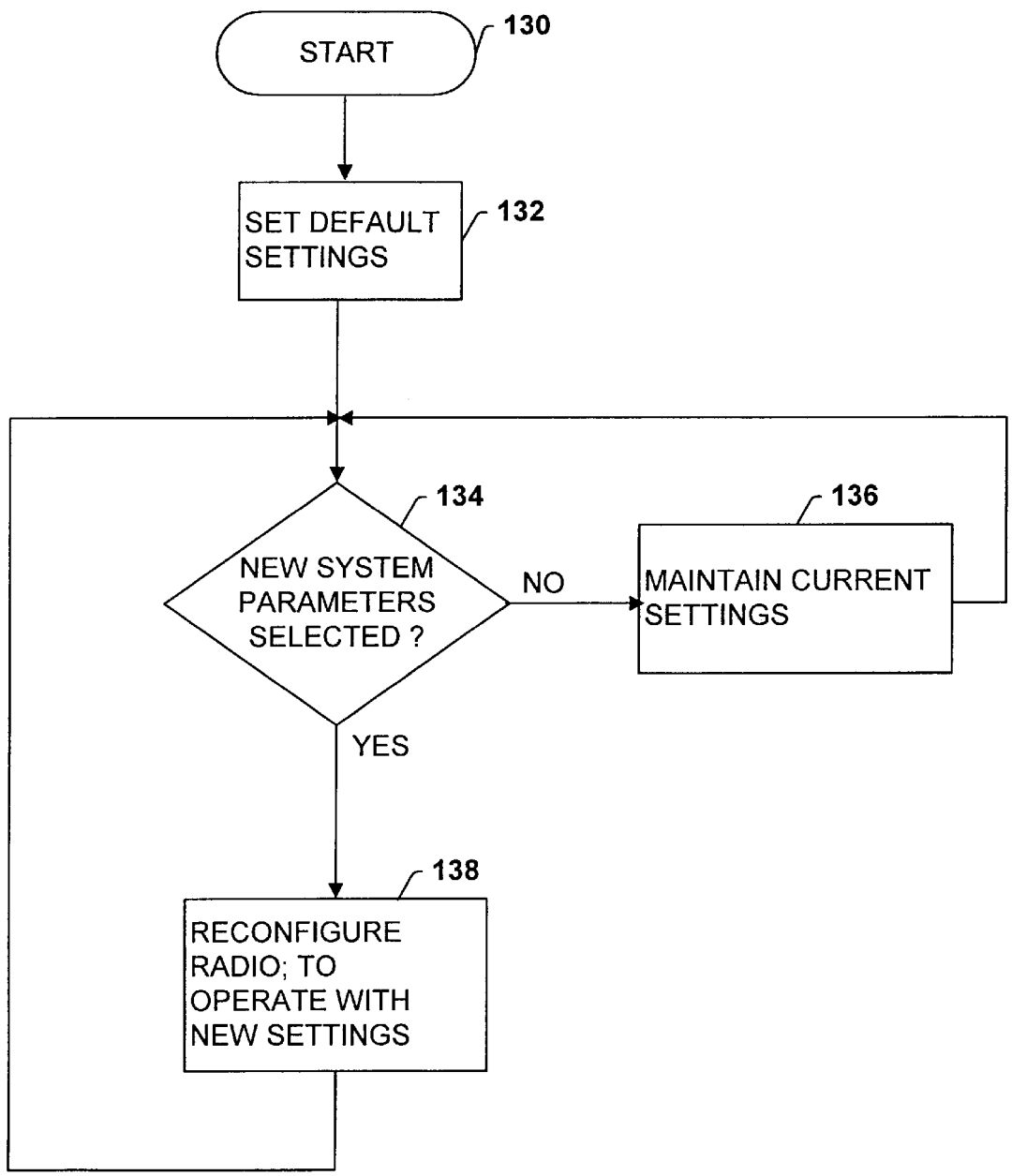
FIG. 4 is a system flowchart representing a method for adjusting the configuration of the communication parameters of the adjustable radio based on a user input.

FIG. 4 is flowchart representing the method in which the radio 6 adjusts its communication parameters. In step 130 the mobile terminal 5 is initialized upon being powered up via an ON/OFF switch or the like. The mobile terminal 5 carries out in step 130 any self-initialization routines conventionally carried out by mobile terminals. In addition, however, in step 132 the microprocessor 26 identifies the default system parameters included in the parameter table 100.

The default system is defined as the system for which the radio 6 was configured prior to being powered down most recently. If the radio 6 has not previously been utilized, the microprocessor 26 is programmed to display a message on the display 8 prompting the user to enter the configuration mode in order to select a particular system. In step 132, the microprocessor 26 accesses the parameters stored in the table 100 for the default system and configures the radio 6 to communicate according to such parameters according to the techniques described more fully below.

Following step 132, the microprocessor 26 determines in step 134 whether new system parameters have been selected. Specifically, the microprocessor 26 is programmed to detect whether the configuration mode has been entered and a new system has been selected via the cursor keys 11a and 11b, the bar code reader 13, keypad entry 10, etc. as discussed above. If not, the microprocessor 26 proceeds to step 136 whereby the radio 6 maintains its current system settings. Following step 136, the microprocessor 26 returns to step 134. If in step 134 the microprocessor 26 detects the selection of a new system via the cursor keys, bar code reader, etc., the microprocessor 26 accesses the parameters for the selected system from the parameter table 100 and proceeds to step 138. In step 138, the microprocessor 26 configures the radio 6 to communicate according to the parameters of the newly selected system based on the techniques described more fully below. Following step 138, the microprocessor 26 returns to step 134 as shown.

Figure 5:
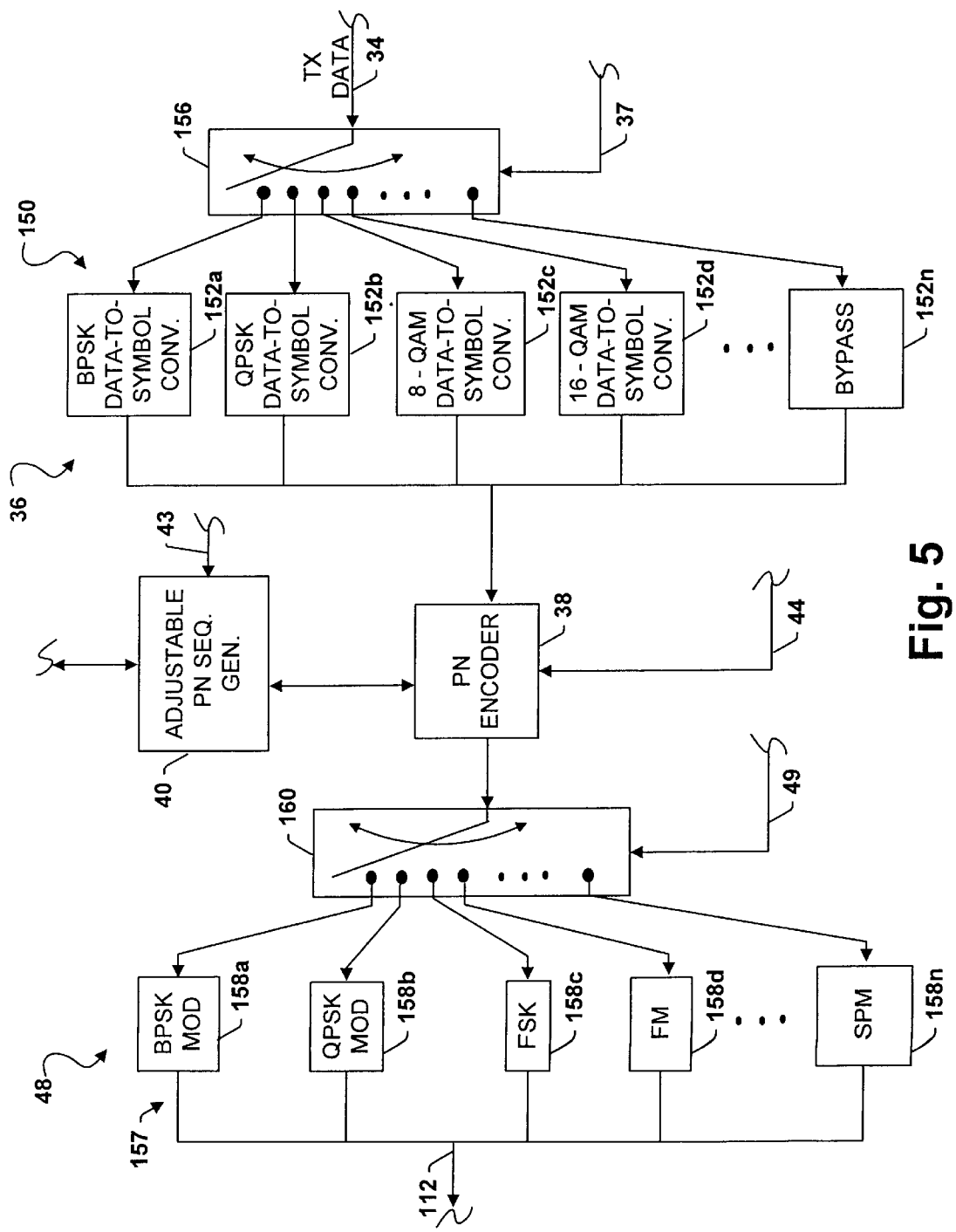
FIG. 5 is a block diagram of a first embodiment of the adjustable modulation and encoding portion of the radio of FIG. 2 in accordance with the present invention.

FIG. 5 shows an embodiment of the adjustable modulation and encoding portion of the radio 6. In this embodiment, the adjustable data-to-symbol converter 36 includes a bank 150 of different types of conventional data-to-symbol converters 152a–152n. For example, converters 152a and 152b carry out BPSK and QPSK data-to-symbol conversion, respectively, for a particular I-Q constellation plane pattern or patterns. The converter 152c carries out 8-QAM data-to-symbol conversion for one or more particular constellation plane patterns. Converters 152d, etc. are preselected to perform other various types of data-to-symbol conversion according to conventional techniques. The bank 150 includes a converter 152 for each of the different types of data-to-symbol conversion which may be identified are in the data↔symbol field 106 of the parameter table 100. The bank 150 also includes a bypass converter 152n which enables the data received from the microprocessor 26 to bypass any conversion as may be appropriate in systems not utilizing data↔symbol conversion.

The adjustable data-to-symbol converter 36 also includes a controllable switch 156 whose position determines which of the particular converters 152a–152n receive the data provided from the microprocessor 26 on line 34. As shown in FIG. 5, the data on line 34 is provided to the pole of the switch 156 and the inputs of the converters 152a–152n are each connected to a respective terminal of the switch 156. The position of the switch 156 is controllable via a control signal provided from the microprocessor 26 via line 37 such that the data on line 34 is coupled to the input of a selected one of the converters 152a–152n. Thus, when the microprocessor 26 retrieves the communication parameters for a selected system from the parameter table 100, the microprocessor 26 is programmed to convert the information stored in the selected data↔symbol field 106 into a control signal provided on line 37 which causes the switch 156 to provide the transmit data on line 34 to the corresponding converter 152.

The respective outputs of each of the converters 152a–152n are coupled to the input of the PN encoder 38. Thus, the selected converter 152a–152n provides the symbol data to the PN encoder 38. As discussed above, the PN encoder 38 encodes the symbol data based on the PN sequence provided by the adjustable PN sequence generator 40. When a system in the parameter table 100 is selected, the microprocessor 26 is programmed to retrieve the information from the PN code field 112 for the selected system. In addition, the microprocessor 26 is programmed to convert such information into the appropriate control information (e.g., the PN sequence) which is provided to the adjustable PN sequence generator 40 via line 43. The PN sequencer generator 40 in turn provides such sequence to the PN encoder 38 so as to function to perform PN encoding in a conventional manner.

The output of the PN encoder 38 is provided to the adjustable modulator 48 which includes a bank 157 of modulators 158a–158n and a controllable switch 160. The bank 157 consists of different types of known modulators 158a, 158b, etc. for modulating the PN encoded data received from the PN encoder 38. For example, modulators 158a and 158b are respectively designed to carry out BPSK and QPSK modulation of the PN encoded data according to conventional techniques. The modulator 158c carries out frequency shift keying (FSK) modulation and modulator 158d carries out frequency (FM) modulation, each according to known techniques. The modulator 158n carries out SPM modulation according to techniques described in the aforementioned application Ser. No. 08/616,254. The bank 157 includes various other types of modulators intended to cover all of the different types of modulation that are represented in the modulation field 104 of the parameter table 100.

The controllable switch 160 determines which of the particular modulators 158a–158n receive the PN encoded data provided from the PN encoder 38. As shown in FIG. 5, the output of the PN encoder 38 is provided to the pole of the switch 160 and the inputs of the modulators 158a–158n are each connected to a respective terminal of the switch 160. The position of the switch 156 is controllable via a control signal provided from the microprocessor 26 via line 49 such that the data from the PN encoder 38 is coupled to the input of a selected one of the modulators 158a–158n. Thus, when the microprocessor 26 retrieves the communication parameters for a selected system from the parameter table 100, the microprocessor 26 is programmed to convert the information stored in the selected modulation field 104 into a control signal provided on line 49 which causes the switch 160 to provide the encoded data from the PN encoder 38 to the corresponding modulator 158.

The respective outputs of the modulators 158a–158n are coupled onto line 112 such that the modulated, encoded data from the adjustable modulation and encoding portion of the radio 6 is provided to the RF upconverter circuit 50. Thereafter, the modulated signal is transmitted via the antenna 15 as discussed above.

Figure 6:
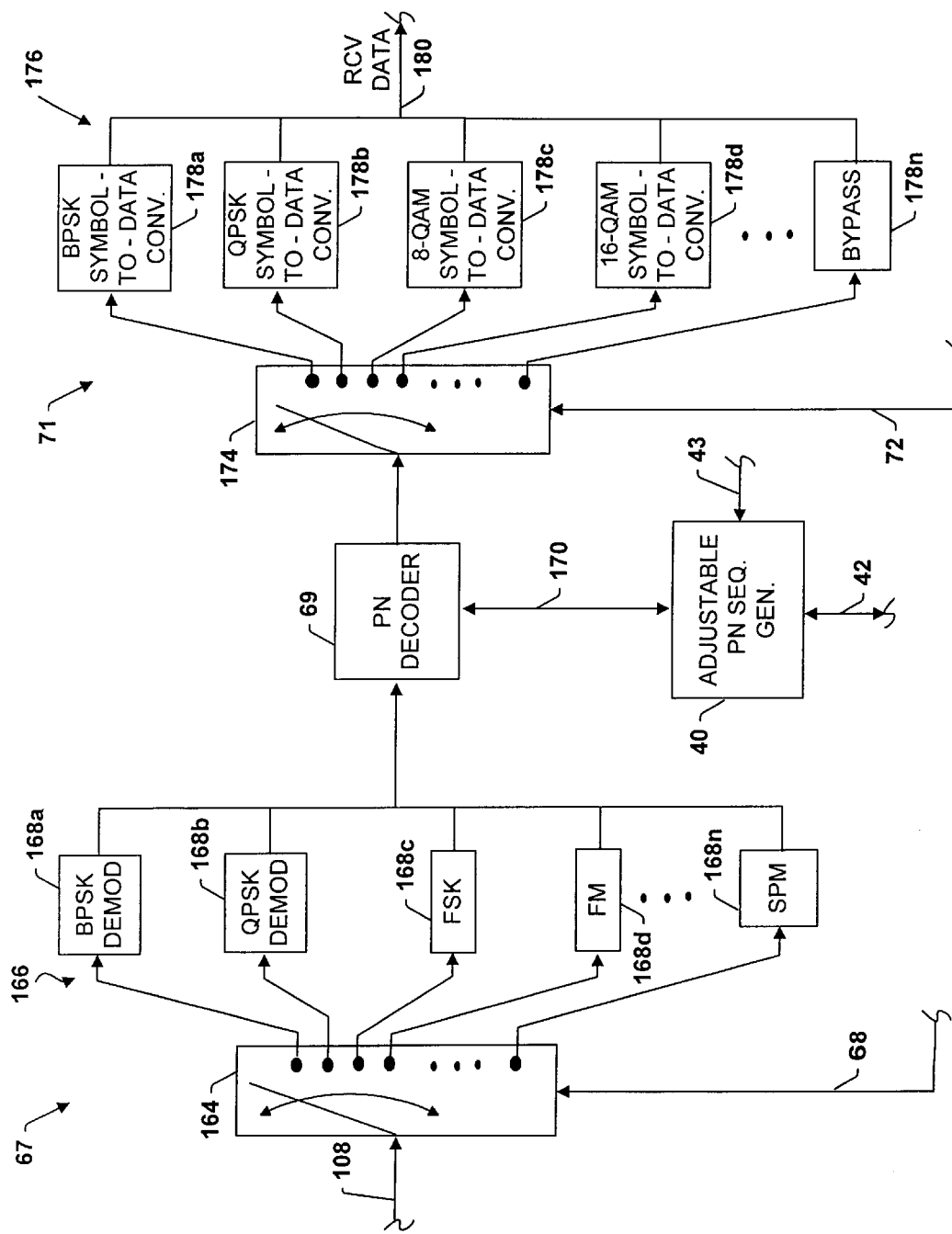
FIG. 6 is a block diagram of a first embodiment of the adjustable demodulation and decoding portion of the radio of FIG. 2 in accordance with the present invention.

FIG. 6 illustrates a corresponding embodiment of the adjustable demodulation and decoding portion of the radio 6. Signals received by the radio 6 are downconverted by the RF downconverter circuit 65 and are input to the adjustable demodulator 67 on line 108 as shown in FIG. 6. The adjustable demodulator 67 includes a controllable switch 164 and a bank 166 of demodulators 168a–168n. The bank 166 consists of different types of known demodulators 168a, 168b, etc., preferably corresponding to the modulators 158a, 158b, etc. in the adjustable modulator 48, for demodulating the PN encoded data received by the radio 6 on line 108. For example, demodulators 168a and 168b are respectively designed to carry out BPSK and QPSK demodulation of the PN encoded data according to conventional techniques. The demodulator 168c carries out frequency shift keying (FSK) demodulation and the demodulator 168d carries out frequency (FM) demodulation, each according to known techniques. The demodulator 158n carries out SPM demodulation, for example, according to techniques described in the aforementioned application Ser. No. 08/616, 254. As will be appreciated, the bank 166 also includes various other types of demodulators intended to cover all of the different types of modulation that are represented in the modulation field 104 of the parameter table 100.

The controllable switch 164 determines which of the particular demodulators 168a–168n receives the PN encoded data provided on line 108. As shown in FIG. 6, the signal on line 108 is provided to the pole of the switch 164 and the inputs of the demodulators 168a–168n are each connected to a respective terminal of the switch 164. The position of the switch 164 is controllable via a control signal provided from the microprocessor 26 via line 68 such that the signal on line 108 is coupled to the input of a selected one of the demodulators 168a–168n. Thus, when the microprocessor 26 retrieves the communication parameters for a selected system from the parameter table 100, the microprocessor 26 is programmed to convert the information stored in the selected modulation field 104 into a control signal provided on line 68 which causes the switch 164 to provide the encoded data from line 108 to the corresponding demodulator 168.

The respective outputs of the demodulators 168a–168n are coupled to a common input to the PN decoder 69. As discussed above, the PN decoder 69 decodes the received symbol data based on the PN sequence provided by the adjustable PN sequence generator 40. When a system in the parameter table 100 is selected, the microprocessor 26 is programmed to retrieve the information from the PN code field 112 for the selected system. As previously mentioned, the microprocessor 26 is programmed to convert such information into the appropriate control information (e.g., the PN sequence) which is provided to the adjustable PN sequence generator 40 via line 43. The PN sequencer generator 40 in turn provides such sequence to the PN decoder 69 via line 170 so as to function to perform PN decoding in a conventional manner. The decoded symbol data from the PN decoder 69 is then input to the adjustable symbol-to-data converter 71 which includes a controllable switch 174 and a bank 176 of different symbol-to-data converters 178a–178n (which preferably correspond to the data-to-symbol converters 152a–152n included in the adjustable data-to-symbol converter 36). For example, converters 178a and 178b are any known converters for carrying out BPSK and QPSK symbol-to-data conversion, respectively, for a particular constellation plane pattern or patterns. The converter 178c carries out 8-QAM symbol-to-data conversion for one or more particular constellation plane patterns. Converters 178d, etc. are preselected to perform other various types of symbol-to-data conversion according to conventional techniques. The bank 176 includes a converter 178 for each of the different types of symbol-to-data conversion which may be identified in the data↔symbol field 106 of the parameter table 100. The bank 176 also includes a bypass converter 178n which provides for the data received from the PN decoder 69 to bypass any conversion as may be appropriate in systems which do not employ symbol data.

The position of the controllable switch 174 determines which of the particular converters 178a–178n receives the symbol data provided from the PN decoder 69. As shown in FIG. 6, the symbol data from the PN decoder 69 is provided to the pole of the switch 174 and the inputs of the converters 178a–178n are each connected to a respective terminal of the switch 174. The position of the switch 174 is controllable via a control signal provided from the microprocessor 26 via line 72 such that the symbol data from the PN decoder 69 is coupled to the input of a selected one of the converters 178a–178n. Thus, when the microprocessor 26 retrieves the communication parameters for a selected system from the parameter table 100, the microprocessor 26 is programmed to convert the information stored in the selected data↔symbol field 106 into a control signal provided on line 72 which causes the switch 174 to provide the symbol data from the PN decoder 69 to the corresponding converter 178.

The respective outputs of each of the converters 178a–178n are coupled to line 180. The output of the selected converter 178 represents the received data which is then input to the microprocessor 26 for subsequent processing.

Accordingly, based on the particular system selected from the parameter table 100 the radio 6 is able to configure itself to transmit and receive information in accordance with the communication parameters of the selected system. For example, assume that in step 134 (FIG. 4) a user selects the system "ABC MODEL IV" via the cursor keys 11a, 11b and the key 11d on the keypad 10. The microprocessor 26 is programmed to access the parameters for the system "ABC MODEL IV" as stored in the parameter table 100 and to reconfigure the radio 6 accordingly. Specifically, the microprocessor 26 determines that the selected system utilizes QPSK modulation as noted in the modulation field 104. Consequently, the microprocessor 26 provides control signals on lines 49 and 68 such that the switches 160 and 164 cause the respective signals to be modulated and demodulated by the QPSK modulator 158b and the QPSK demodulator 168b, respectively. The microprocessor 26 determines that the selected system utilizes a data↔symbol constellation plane pattern represented by Pattern 3 based on the data-symbol field 106. As a result, the microprocessor 26 provides control signals on lines 37 and 72 such that the switches 156 and 174 cause the respective signals to be converted via QPSK data-to-symbol converter 152b and symbol-to-data converter 178b via a constellation plane pattern represented by Pattern 3.

The microprocessor 26 further determines that the hopping sequence of the selected system is in accordance with Set 3, Pattern 21 based on the hopping sequence field 110. Accordingly, the microprocessor 26 is programmed to provide the aforementioned hopping sequence information to the adjustable synthesizer 60 via line 62 as shown in FIG. 2. As a result, the RF upconverter circuit 50 and RF downconverter circuit 65 are driven by the adjustable synthesizer 60 to hop according to the hopping sequence of the selected "ABC MODEL IV" system. Based on the information in the PN code field 112, the microprocessor 26 determines that the selected system utilizes a PN sequence of dsequence15 to encode and decode the data. Consequently, the microprocessor 26 provides the selected sequence dsequence15 to the adjustable PN sequence generator 40 via line 43 so that the PN encoder 38 and PN decoder 69 respectively encode and decode the signals in accordance with dsequence 15. Furthermore, the microprocessor 26 determines from the data rate field 114 the appropriate hop rate and chip rate (nominally identified as FHrate6 and DSrate2, for example). Consequently, the microprocessor 26 adjusts the hop rate and chip rate timing of the adjustable synthesizer 60 and adjustable PN sequence generator 40 via lines 62 and 43, respectively. In addition, the various data rates and sample rates within the various components in the radio are adjusted accordingly so as to result in the appropriate data rate for the selected system.

The radio 6 can be similarly configured for any of the other systems included in the parameter table 100. It is noted that with respect to non-hopping systems, the microprocessor 26 detects the carrier frequency of the system based on the information in the frequency range field 108. The microprocessor 26 then provides a control signal on line 62 which causes the adjustable synthesizer 60 to remain fixed at the selected carrier frequency.

Figure 7:
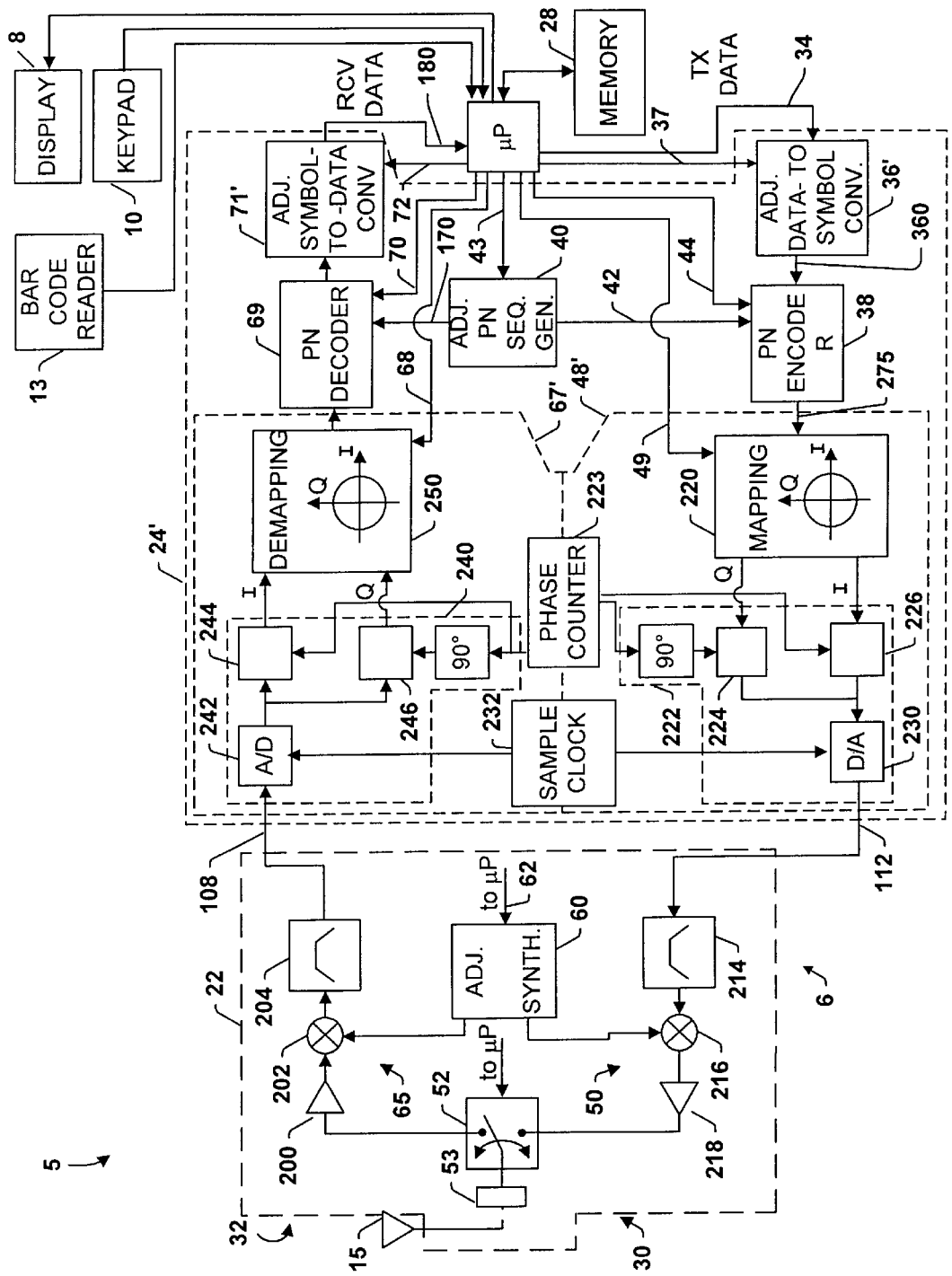
FIG. 7 is a detailed block diagram of a mobile terminal with an adjustable radio including adjustable modulation/demodulation and encoding/decoding portions in accordance with a second embodiment of the present invention.

Referring now to FIG. 7, a detailed block diagram of the mobile terminal 5 with the adjustable radio 6 is shown in accordance with another embodiment. In this embodiment, the radio 6 utilizes programmable digital modulation and conversion in lieu of banks of discrete modulators and converters as shown in FIGS. 5 and 6. The components which differ from the embodiment shown in FIG. 2 are denoted by a prime, and those components not denoted by a prime are similar to those shown in FIG. 2. The following description is limited primarily to only those features which are different, with the exception that the RF section 22 will be described in more detail.

As shown in FIG. 7, the RF downconverter circuit 65 includes a low noise amplifier (LNA) 200 which amplifies signals received by the antenna 15 which are to be demodulated to extract transmitted data. The output of the LNA 200 is provided to a mixer 202 which mixes the incoming RF signal down in frequency. The output of the mixer 202 is provided to a surface acoustic wave (SAW) filter 204 which filters the incoming signal to reduce any undesired noise. Thereafter, the output of the SAW filter 204 is provided to the input of the adjustable demodulator 67' via line 108 as shown.

The RF upconverter 50 includes a SAW filter 214 which filters the output of the adjustable modulator 48' to eliminate any by-products which may have occurred as a result of the modulation process. The output of the SAW filter 214 is subsequently mixed by mixer 216 up onto the RF carrier frequency. The output of the mixer 216 is then input to a power amplifier 218 where the RF modulated signal is amplified prior to being transmitted via the antenna 15 and antenna switch 52. Each mixer 202 and 216 is coupled to the adjustable synthesizer 60 as shown in FIG. 7 such that the appropriate mixing frequencies are provided to each of the mixers so as to follow the hopping sequence/fixed carrier frequency of the selected system.

FIG. 7 also shows in detail the adjustable modulator 48' and adjustable demodulator 67' according to this embodiment. Generally speaking, the adjustable modulator 48' and adjustable demodulator 67' are similar in construction to the SPM modulator and demodulator described in the aforementioned U.S. application Ser. No. 08/616,254. The primary distinction is that the mapping and demapping circuits in the respective components can be modified to incorporate modulation techniques other than SPM as discussed below in relation to FIGS. 8 and 9. For example, a digital BPSK/APSK modulation or demodulation could be achieved using a memory mapping similar to that done in a "Prisim Chip Set" part number HFA3724R3417 produced by Harris Semiconductor of Melborne, Fla.

Referring initially to the adjustable modulator 48', the PN coded symbol data from the PN encoder 38 is input to a mapping circuit 220. As is explained in more detail below, the mapping circuit 220 provides the appropriate I and Q components corresponding to the phase states represented by the symbol data both during time periods Tfixed wherein the symbol data is represented by a fixed phase state and during times Ttran when the phase of the modulated signal is to transition from one phase state to another. The values of the I and Q components are controlled during such transition times Ttran so as to ensure that the phase of the modulated carrier signal changes with the rate, etc. to provide the desired form of modulation. For example, to achieve FSK modulation the rate at which the I and Q components represent a change in phase determines the frequency as will be appreciated. As is discussed below in relation to FIG. 8, the mapping circuit 220 receives control information from the microprocessor 26 via line 49 which determines the particular form of modulation performed by the adjustable modulator 48' (e.g., BPSK, QPSK, SPM, etc.).

The I and Q components are output in digital form from the mapping circuit 220 and are subsequently provided to a digital quadrature modulator 222. The digital quadrature modulator 222 digitally modulates the I and Q components onto a sinusoid carrier signal, the frequency and relative phase of which is determined by a phase counter 223 which provides a digital reference signal to the modulator 222.

The digital quadrature modulator 222 can be of conventional design such as that described in U.S. Pat. No. 5,225,795 to Iinuma. As is discussed in detail in the '795 patent, the modulator 222 includes first and second storage devices 224 and 226 for receiving the Q and I components, respectively, from the mapping circuit 220 and carrier phase information from the phase counter 223. The phase information provided to the first storage device 224 from the phase counter 223 is shifted by $\pi/2$ radians. The I and Q components together with the phase information from the phase counter 223 serve as addresses to the respective storage devices. The storage devices 224 and 226 have stored therein at the corresponding addresses the multiplication result of the respective I and Q components and the reference signal. This information is output from each storage device and the respective outputs are added and then converted into an analog signal by a digital-to-analog (D/A) converter 230. The resultant modulated analog signal is then output by the modulator 222 to the RF upconverter circuit 50 via line 112. The entire disclosure of U.S. Pat. No. 5,225,795 is incorporated herein by reference.

In the preferred embodiment, the phase counter 223 outputs the digital phase information at a rate controlled by the microprocessor 26 at the appropriate frequency. The D/A converter 230 is clocked by a sample clock 232 at a rate on the order of 200 MHz which is at least eight times the rate of the I and Q components. This allows a representative analog signal to be created.

In the case of signals which are received by the radio 6, the output of the RF downconverter circuit 65 is provided via line 108 to a digital quadrature demodulator 240 which is included in the adjustable demodulator 67'. The demodulator 240 includes an analog-to-digital converter (A/D) 242 which converts the analog signal received from the SAW filter 204 into a digital signal. The output of the A/D 242 represents the incoming modulated signal and is provided as an address to each of first and second storage devices 244 and 246. In addition, the first and second storage devices 144 and 146 receive digital phase information from the phase counter 223 as an address, the phase information provided to the second storage device 246 from the phase counter 223 being shifted by n/2 radians. The storage devices 244 and 246 have stored therein corresponding values of the I and Q components in relation to such addresses, respectively. Thus, the digital demodulator 240 outputs the I and Q components of the received signal.

The A/D 242 is also clocked by the sample clock 232 as is the D/A 230. In order to adequately represent the entire waveform of the incoming signal received on line 108, the A/D 142 also is clocked at a frequency which is at least eight times the frequency of the incoming signal at that point in the radio 6.

The I and Q components from the digital demodulator 240 are provided to a demapping circuit 250 which is also included in the adjustable demodulator 67'. The demapping circuit 250 converts the I and Q components into the corresponding PN coded symbol data as described in more detail below in connection with FIG. 9. Specifically, the mapping circuit 220 receives control information from the microprocessor 26 via line 68 which determines the particular form of demodulation performed by the adjustable demodulator 67' (e.g., BPSK, QPSK, SPM, etc.).

Figure 8:
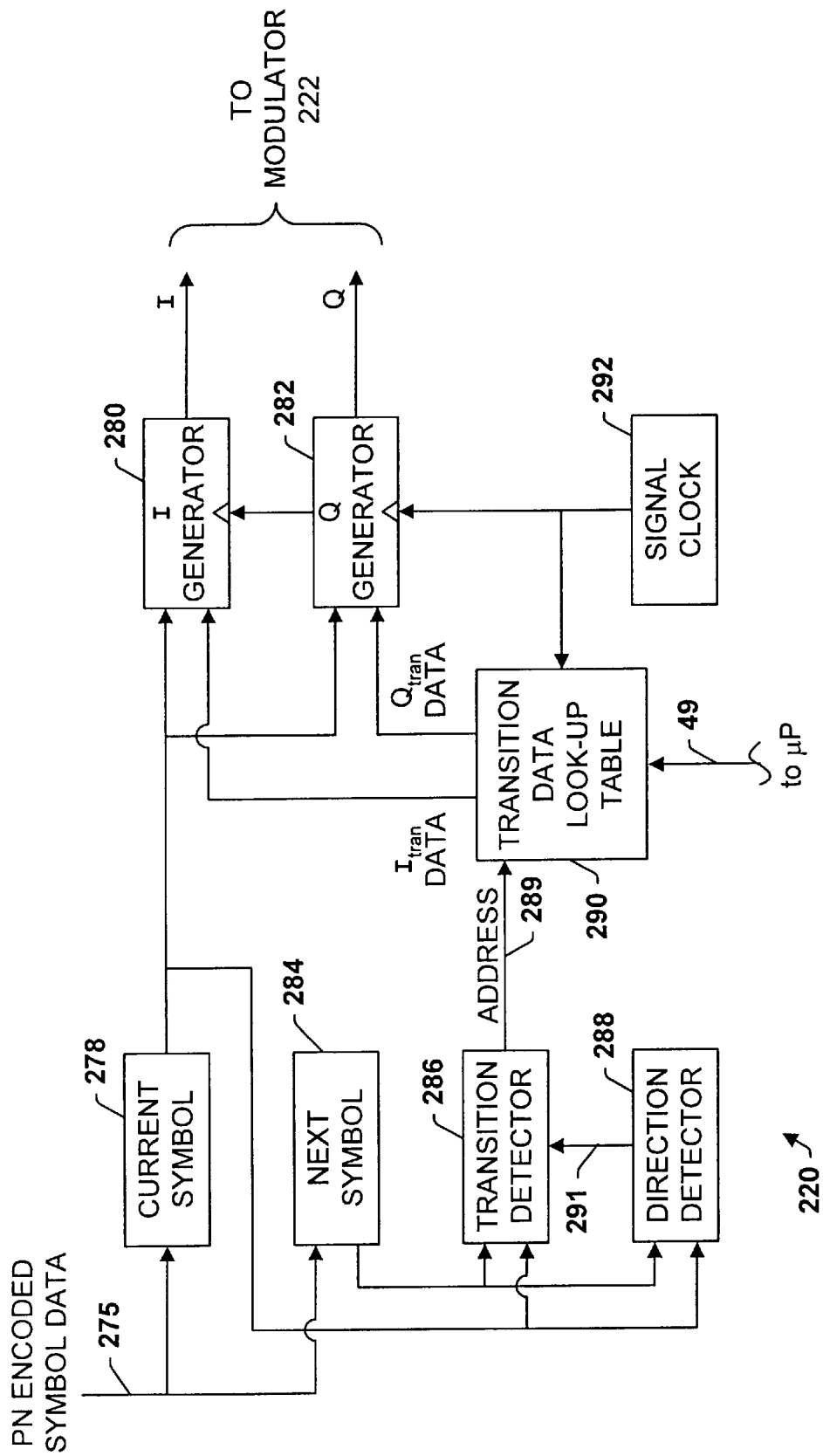
FIG. 8 is a detailed block diagram of the mapping circuit included in the adjustable modulation portion according to the second embodiment of the present invention.

FIG. 8 represents an exemplary embodiment of the mapping circuit 220. PN coded symbol data from the PN encoder 38 is input via line 275. The symbol data (e.g., symbol A) representing the current phase state in the PN coded symbol data sequence is stored in current symbol register 278. The contents of the current symbol register 278 are output to an I component generator 280 and a Q component generator 282. The generators 280 and 282 are designed such that during a fixed phase state period Tfixed, each of the generators outputs the fixed digital values corresponding to I and Q.

For example, when the current symbol is represented by symbol A, the I and Q generators 280 and 282 both output fixed values corresponding to the symbol A during the time period Tfixed. In order to also provide the values of the I and Q components during the transition periods Ttran, however, the mapping circuit 220 also includes a next symbol register 284 which stores the next symbol data immediately following the current symbol data in the symbol data sequence. The contents of the next symbol register 284 are output to a transition detector 286 and a transition direction detector 288. The contents of the current symbol register 278 are also output to the transition detector 286 and the transition direction detector 288. The transition detector 286 is designed to detect the particular phase transition which is to occur following the time period Tfixed corresponding to the current symbol data. Specifically, the transition detector 286 compares the current symbol data to the next symbol data to identify the particular transition. For example, if the current symbol data is A and the next symbol data is C, then the transition detector 286 identifies the upcoming transition as A→C.

The direction detector 288 is designed to detect and store the phase change direction (i.e., clockwise or counterclockwise) of the immediately preceding phase transition. Such information is useful in the SPM modulation technique referred to above wherein the phase of the carrier is modulated preferably so as to take the shortest path about the unit circle. Such information is also useful in other modulation techniques which rely on the direction of the phase change as will be appreciated. This information is stored in the direction detector 288 and is provided to the transition detector 286 via line 291.

In view of the particular transition and direction information ascertained by the transition detector 286, the transition detector 286 is designed to output a starting address on line 289 to a transition data look up table 290. The particular starting address is indicative of a desired transition and direction which is upcoming. The transition data look up table 290 is an addressable memory having stored therein the I and Q component values during the transition time Ttran for each of the possible transitions and directions. Thus, the starting address accesses the appropriate set of I and Q component values for the upcoming transition. In the event there is no transition between the current and next symbols in the symbol data sequence (e.g., A→A, or B→B), the transition detector 286 addresses a no-transition indicator stored in the look up table 190.

Figure 9:
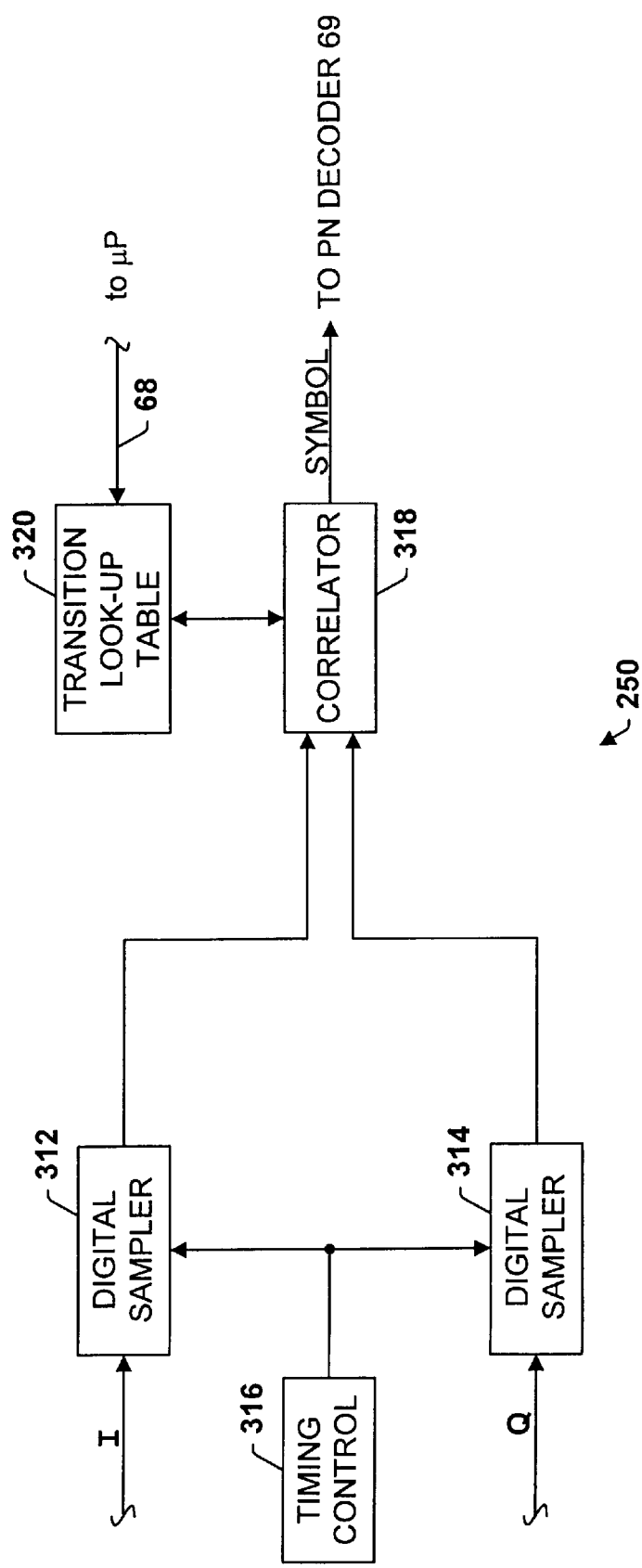
FIG. 9 is a detailed block diagram of the demapping circuit included in the adjustable demodulation portion according to the second embodiment of the present invention.

Continuing to refer to FIG. 9, a signal clock 292 provides a clock output which increments the addressing of the look-up table 290 beginning at a time tstart in the transition period Ttran so that a sequence of digital I and Q component values corresponding to the transition are output throughout the transition period Ttran until a time tstop. The same signal clock 292 output is used to clock the I and Q generators 280 and 282, respectively, during the transition period Ttran. The I and Q generators 280 and 282, respectively, are configured to output the values of I and Q as retrieved from the look up table 290 during each transition period Ttran. The I and Q component values are in turn provided to the modulator 222 in order to be modulated onto the carrier as previously discussed. As will be appreciated, the inputs and outputs of the I and Q generators together with the provision of the I and Q component values from the look up table 290 are synchronized with the modulator 222. The timing within the I and Q generators 280 and 282 is controlled relative to a symbol data clock such that the transitions occur during a preselected time. If the transition detector 286 detects no transition between adjacent symbols, the no-transition indicator is output from the look up table 290 and provided to the I and Q generators 280 and 282 to indicate that there is no upcoming transition. The I and Q generators 280 and 282 then know to maintain the current values of I and Q at their respective outputs.

Additional detail as to the construction and operation of the adjustable modulator 48' with respect to operation using SPM techniques is provided in the aforementioned U.S. application Ser. No. 08/616,254. In order to implement other types of modulation (e.g., BPSK, QPSK, FSK, MSK, etc.), the transition data look-up table includes data defining the respective transitions between phase states in each of the different types of modulation. Such transitions may be abrupt as in the case of conventional BPSK or QPSK modulation, or gradual as in the case of FSK modulation, for example. The control information provided by the microprocessor 26 on line 49 represents a most significant address which accesses a general location in the look-up table 290 corresponding to the selected modulation technique. Thereafter, the address data provided on line 289 via the transition detector 286 and signal clock 292 provide the least significant addressing relating to the specific transitions included in the selected modulation technique. The determination of the particular transition data for each modulation technique will depend on such factors as the constellation plane pattern, the type of modulation and whether it employs abrupt transitions or gradual transitions, etc. Those having ordinary skill in the art will be able to arrive at such transition data values based on the disclosure provided herein. Hence, further detail is omitted.

FIG. 9 provides a detailed block diagram of the demapping circuit 250. The digital quadrature demodulator 240 provides the digital I and Q components or values of the incoming signal to the demapping circuit 250. The I and Q values are input into corresponding I and Q digital samplers 312 and 314, respectively. The digital samplers 312 and 314 are clocked by a timing control circuit 316 such that during each transition of the incoming signal from one phase state to another phase state, the digital samplers 312 and 314 obtain multiple samples of the corresponding I and Q values. In the exemplary embodiment, the digital samplers are controlled so as to obtain four samples during each transition period Ttran, for example.

For each transition period, the samples are output from the digital samplers 312 and 314 and are input to a correlator circuit 318. Also connected to an input of the correlator circuit 318 is a transition look-up table 320. The transition look-up table 320 has stored therein four corresponding I and Q samples for each possible transition (including direction) between phase states. The correlator circuit 318 then compares the samples obtained by the digital samplers 312 and 314 for I and Q with the values of I and Q in the transition look-up table 320. Specifically, the correlator circuit 318 determines which corresponding I and Q values in the transition look-up table 320 exhibit the best correlation with those provided by the digital samplers 312 and 314 for a given transition. The particular phase state transition associated with the corresponding I and Q values, as determined from the transition look-up table 320, is identified by the correlator circuit 318. As a result, the symbol representing the phase state at the end of the transition period is output by the correlator circuit 318. The PN coded symbol data is then input to the PN decoder 69. Thus, the demapping circuit 250 is able to identify the incoming symbol data based on the correlation of the I and Q component values during the transitions.

The timing control circuit 316 is synchronized using conventional techniques to the incoming signal based on the synchronizing bits provided with each incoming signal. Hence, the timing control circuit 316 is able to provide the appropriate timing signals to the digital samplers 312 and 314 in order to control the sampling times as will be appreciated.

In order to provide for adjustability between different types of modulation, the transition look-up table 320 has stored therein the I and Q values corresponding to the respective phase states for each of the types of modulation listed in the parameter table 100. Line 68 from the microprocessor 26 serves as a most significant address to the look-up table 320 which accesses the I and Q values for a particular type of modulation. Thus, the control information provided by the microprocessor 26 on line 68 accesses a general location in the look-up table 320 corresponding to the selected modulation technique. Thereafter, the address data provided by the correlator circuit 318 provides the least significant addressing which pertains to the data for the specific transitions which may occur in the selected modulation technique. The determination of the particular transition data for each modulation technique will depend on such factors as the constellation plane pattern, the type of modulation and whether it employs abrupt transitions or gradual transitions, etc. Those having ordinary skill in the art will be able to arrive at such transition data values based on the disclosure provided herein. Hence, further detail is again omitted.

FIG. 10 illustrates the adjustable data-to-symbol converter 36' shown in the embodiment of FIG. 7. The converter 36' includes a memory table 350 which contains conversion data representing the appropriate symbols for each of the different types of conversion and constellation plane patterns which may be utilized by the radio 6. For example, the memory table 350 may include a separately addressable conversion data section 352a relating to a form of BPSK modulation. In addition, the memory table 350 may include separately addressable conversion data sections 352b and 352c relating to types of QPSK and 8-QAM modulation, respectively. Other forms of conversion are also possible as will be appreciated. Furthermore, the memory table 350 may include a bypass section 352n whereby the converted data which is output from the memory table 350 is identical to the transmit data provided by the microprocessor 26.

As shown in FIG. 10, the transmit data from the microprocessor 26 is provided serially on line 34 to a parallel output shift register 358 which is included in the converter 36'. Depending on the particular type of modulation which is utilized (i.e., the number of data bits per symbol data), the appropriate number of bits per symbol is shifted into the register 358. Such bits then serve as the least significant address to the memory table 350 for accessing the corresponding symbol data which has been previously stored therein. The symbol data is output from the memory table 350 via line 360 to the PN encoder 38. The control data from the microprocessor 26 on line 37 serves as the most significant address to the memory table 350 and determines which particular conversion data section 352a, 352b, etc. is accessed. Thus, the microprocessor 26 is able to adjust the type of data-to-symbol conversion which is performed by the converter 36.

FIG. 11 shows the corresponding symbol-to-data converter 71' included in the embodiment of FIG. 7. The converter 71' includes a memory table 362 which is similar to the table 350 but instead has stored therein data corresponding to the particular symbol values which are to be converted. Specifically, the memory table 362 includes separately addressable conversion data sections 364a–364n which include data corresponding to the symbol values that are provided as the least significant address to the memory from the PN decoder 69. Each section 364a–364n applies to a different type of conversion and/or constellation plane pattern in the same manner as the memory table 350 in the converter 350. For example, the memory table 362 may include a separately addressable conversion data section 364a relating to a form of BPSK modulation. In addition, the memory table 362 may include separately addressable conversion data sections 364b and 364c relating to types of QPSK and 8-QAM modulation, respectively. Other forms of conversion are also possible as will be appreciated. Furthermore, the memory table 362 may include a bypass section 364n whereby the converted data which is output from the memory table 350 is identical to the data provided by the PN decoder 69.

As previously mentioned, the symbol data from the PN decoder 69 serves as the least significant address. The control information from the microprocessor 26 provided on line 72 serves as the most significant address and determines which of the particular conversion data sections 364a, 364b, etc. is accessed so as to determine the type of symbol-to-data conversion which occurs. Stored in the corresponding address location is the converted data which is output to a parallel input-serial output shift register 368. The converted data is then output from the shift register 368 onto line 180.

Figure 12:
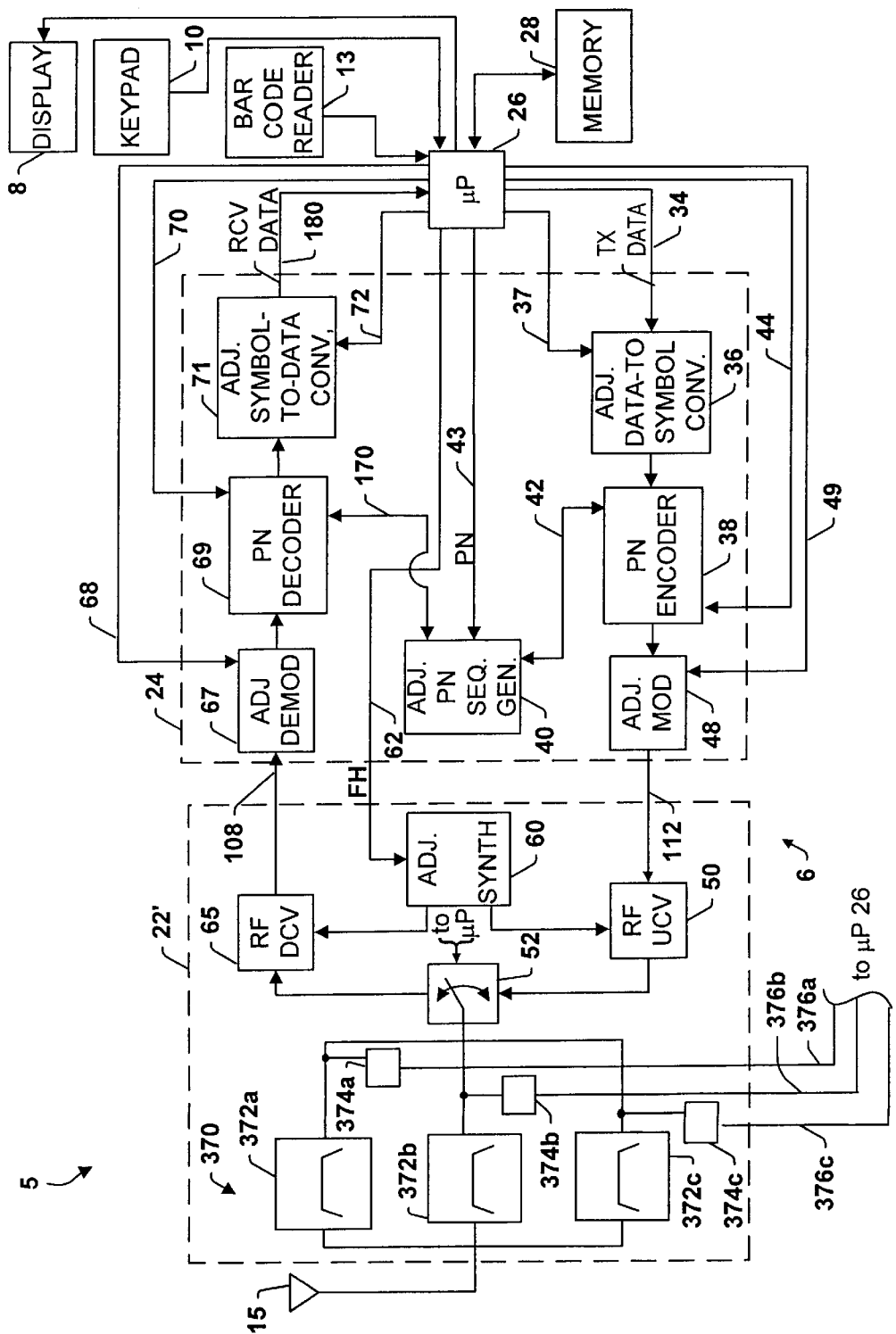
FIG. 12 is a block diagram of a mobile terminal with an adjustable radio according to a third embodiment of the present invention.

Referring now to FIG. 12, another embodiment of the radio 6 is shown for the mobile terminal 5. The embodiment of FIG. 12 includes a modified RF section 22' in combination with the remaining portion of the radio which is substantially identical to that described above in relation to FIG. 2. Consequently, only the differences between the embodiments will be discussed herein. It will be appreciated, however, that the modified RF section 22' could also be utilized in place of the RF section 22 in the embodiment of FIG. 7.

The RF section 22' allows the radio 6 to communicate with one or two other radios in different frequency bands substantially simultaneously. Such radios may operate in different cellular communication systems, for example. Each band is used to carry out communications according to the communication parameters of a selected system as stored in the parameter table 100 (FIG. 3). For example, the RF section 22' allows the microprocessor 26 to determine which particular frequency band a signal is received on. Based on such information, the microprocessor 26 accesses the parameter table 100 to obtain the communication parameters for the particular system associated with communications in that particular frequency band. Thereafter, the microprocessor 26 is programmed to adjust the communication parameters of the radio 6 according to the same techniques described above. In this manner, the radio 6 configures itself to respond to the received signal. Because the microprocessor 26 and the related circuitry operates at a relatively high clock speed in relation to the data which is received, the radio is able to configure itself substantially instantaneously without significant loss of data in the received signal. Accordingly, the radio 6 is able to respond to received signals from one or more different radios by reconfiguring its communication parameters in response to detecting the particular frequency band in which the signal is received.

In the event the mobile terminal 5 wishes to transmit information that is not in response to a particular signal that has previously been received, the microprocessor 6 is programmed to access from the table 100 the communication parameters associated with the frequency band in which the mobile terminal 5 desires to transmit the information. The manner in which a user may select which system communication parameters are associated with which frequency bands is discussed below in relation to FIG. 13. By configuring itself to operate simultaneously on different frequency bands, the radio 6 is able to communicate with two or more different radios substantially simultaneously. This enables the mobile terminal 5 to communicate with base stations belonging to different cellular communication systems, for example.

As shown in FIG. 12, the antenna 15 is connected to a filter bank 370 included in the RF section 22'. In the exemplary embodiment, the filter bank 370 includes bandpass filters 372a–372c connected in parallel. Filter 372a is designed to pass signals in the 806–870 MHz range. Filters 372b and 372c are designed to pass signals in the 902–928 MHz range and 2.4–2.48 GHz range, respectively. The antenna 15 is connected to a terminal of each of the filters and the other terminal of each of the filters is connected to the antenna terminal of the antenna switch 52. In another embodiment, it is possible that each filter is configured to handle a different frequency range and/or a different number of filters may be included in the filter bank 370.

Figure 14:
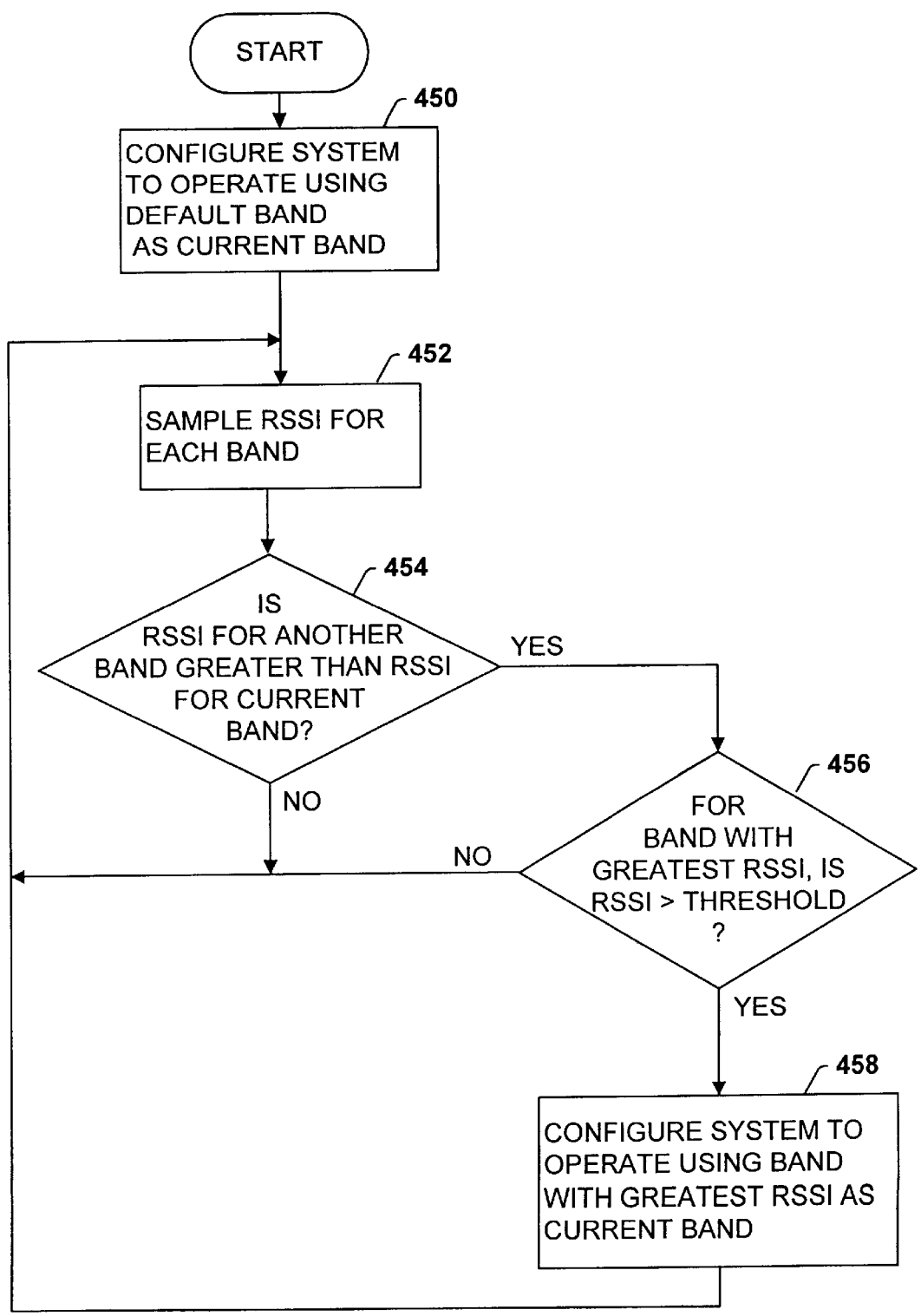
FIG. 14 is a system flowchart illustrating the automated reconfiguration of the adjustable radio of FIG. 12 in order to receive communications from different bands in accordance with the present invention.

Regarding signals that are received by the antenna 15, the received signal strength (RSSI) at the output of each filter 372a–372c is monitored by the microprocessor 26 through corresponding RF signal strength circuits 374a–374c. The RF signal strength circuits 374a–374c provide to the microprocessor 26 an indication on lines 376a–376c, respectively, of the strength of any signal received in the corresponding frequency band. FIG. 14 below describes the process whereby the microprocessor 26 reconfigures the communication parameters of the radio in response to the RSSI signals received from the RF signal strength circuits 374a–374c.

Figure 13:
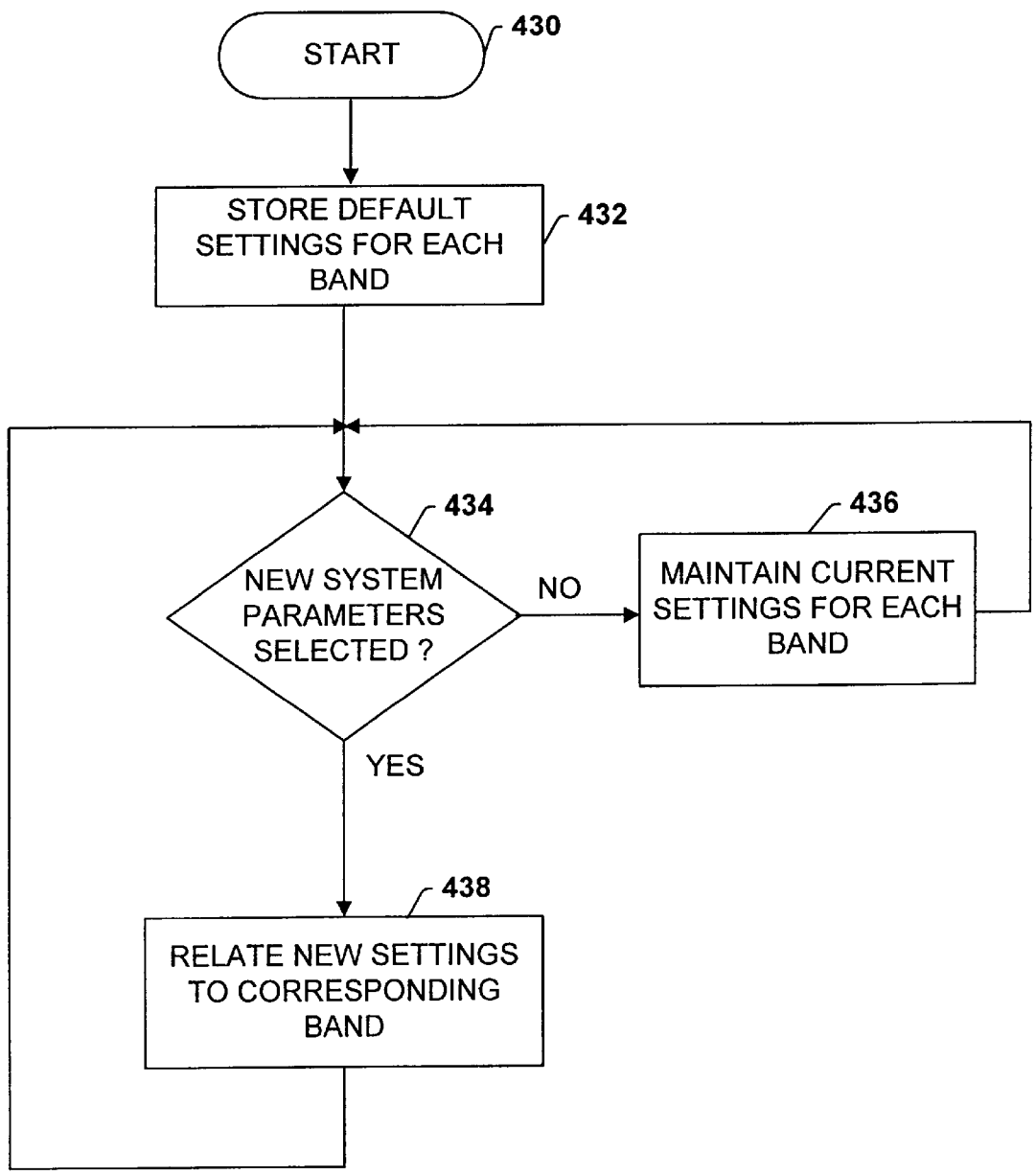
FIG. 13 is a system flowchart representing a method for adjusting the configuration of the communication parameters of the adjustable radio of FIG. 12 based on different frequency bands in accordance with the present invention.

Referring now to FIG. 13, a flowchart is shown illustrating the manner in which the frequency bands associated with the different filters 372a–372c are determined. Beginning in step 430 the mobile terminal 5 is initialized upon being powered up via an ON/OFF switch or the like. The mobile terminal carries out any self-initialization routines conventionally carried out by mobile terminals. In addition, however, in step 432 the microprocessor 26 identifies and stores in memory the default system parameters included in the parameter table 100 for each respective band. In the exemplary embodiment, the bands 1–3 correspond to the frequency bands 806–870 MHz, 902–928 MHz and 2.4–2.48 GHz, respectively. The default system for each band is defined as the respective system identified in the system field 102 which was associated with the particular band prior to the radio 6 being powered down the last time. If the radio 6 has not previously been utilized, the microprocessor 26 is programmed to display a message on the display 8 prompting the user to enter the configuration mode in order to select a particular system from the parameter table 100 as the default system in each band.

Following step 432, the microprocessor 26 determines in step 434 whether the configuration mode has been entered and new system parameters have been selected. Specifically, the microprocessor 26 is programmed to detect whether a new system has been selected via the cursor keys 11a and 11b, the bar code reader 13, keypad entry 10, etc. as discussed above. The user may designate the particular band the system parameters are being selected for via the number keys on the keypad 10, for example, in response to a prompt shown on the display 8. The microprocessor 26 is programmed so as to not accept as parameters for a given band a system which operates outside of the band. For example, the microprocessor 26 compares the frequency range information stored in the frequency range field 108 for a selected system in the table 100 to the frequency range of the particular band. If the frequency range in the field 108 is within the particular band, the selection of the new system is accepted by the microprocessor 26. Otherwise, the microprocessor 26 displays a prompt asking the user to select another system.

If in step 434 the microprocessor 26 determines that new system parameters have not been selected, the microprocessor 26 proceeds to step 436 whereby the radio 6 maintains its current system settings in memory with respect to each band. Following step 436, the microprocessor 26 returns to step 434. If in step 434 the microprocessor 26 detects the selection of a new system for any one of the bands via the cursor keys, bar code reader, etc., the microprocessor 26 proceeds to step 438. In step 438, the microprocessor 26 accesses the parameters for the selected system from the parameter table 100 and stores such parameters in memory in relation to the corresponding band. In the event a system had been previously selected for a particular band, such selection is replaced in memory by the most recent selection. Following step 438, the microprocessor 26 returns to step 434 as shown.

FIG. 14 is a flowchart illustrating the manner in which the microprocessor 26 is programmed to operate using more than one set of system communication parameters at a time. Particularly, in step 450 the microprocessor 26 is preprogrammed to select a default band (e.g., band 1) as the current band for communicating via the radio 6. The microprocessor 26 configures the radio 6 in step 450 to operate according to the communication parameters for the system in the table 100 identified in memory as corresponding to the particular band (e.g, system ABC Model III). Next, in step 452 the microprocessor 26 samples the RSSI signal for each band 1–3 based on the RSSI signals provided on lines 376a–376c, respectively. Based on the information provided in step 452, the microprocessor 26 in step 454 determines whether the RSSI signal for another band (e.g., bands 2 and 3) is greater than the RSSI signal for the current band. If not, the microprocessor 26 concludes that a signal is not being received on either of the other bands and the microprocessor 26 returns to step 452.

On the other hand, if in step 454 the microprocessor 26 determines that the RSSI signal for another band is greater than that of the current band, the microprocessor 26 proceeds to step 456 in which it determines if the band exhibiting the greatest (i.e., largest) RSSI signal has a signal level which exceeds a predefined threshold. Such threshold preferably is on the order of −80 dbm or so as to distinguish between noise and what is likely to be a legitimate signal. If the greatest RSSI signal has a signal level which exceeds the threshold so as to indicate that the signal received on the corresponding band is a legitimate signal, the microprocessor 26 proceeds to step 458. In step 458 the microprocessor 26 identifies the particular band with the largest RSSI signal as the new current band. Consequently, the microprocessor 26 determines from memory the communication parameters for the system associated with the newly identified current band. The microprocessor 26 in step 458 then proceeds to configure the various adjustable components in the radio to operate in accordance with the communication parameters of the current band. Such configuration is performed according to the same techniques discussed above in relation to the embodiment of FIG. 2. As previously noted, the time required for the microprocessor 26 to reconfigure the radio 6 is very short compared to the time it takes to receive a given signal. Therefore, little or no signal will be lost at the receiving end due to the time it takes to reconfigure the radio 6 to receive the incoming signal.

If in step 456 the band exhibiting the greatest RSSI signal does not have an RSSI signal which exceeds the predetermined threshold (indicating what is most likely to be noise), the microprocessor 26 returns directly to step 452 as shown.

When transmitting information, the microprocessor 26 simply preselects as the current band the band having the communication parameters with which the microprocessor 26 wants to transmit the information. Using this operating scheme, the radio 6 can function as a universal radio capable of adjustably switching between different radio parameters or communicating with more than one radio operating in different frequency ranges.

It is noted that in the embodiment of FIG. 12 a single antenna 15 is used to provide the receive signal to each of the respective filters in the filter bank 370. In another embodiment, however, a separate antenna can be associated with each filter as will be appreciated.

Figure 15:
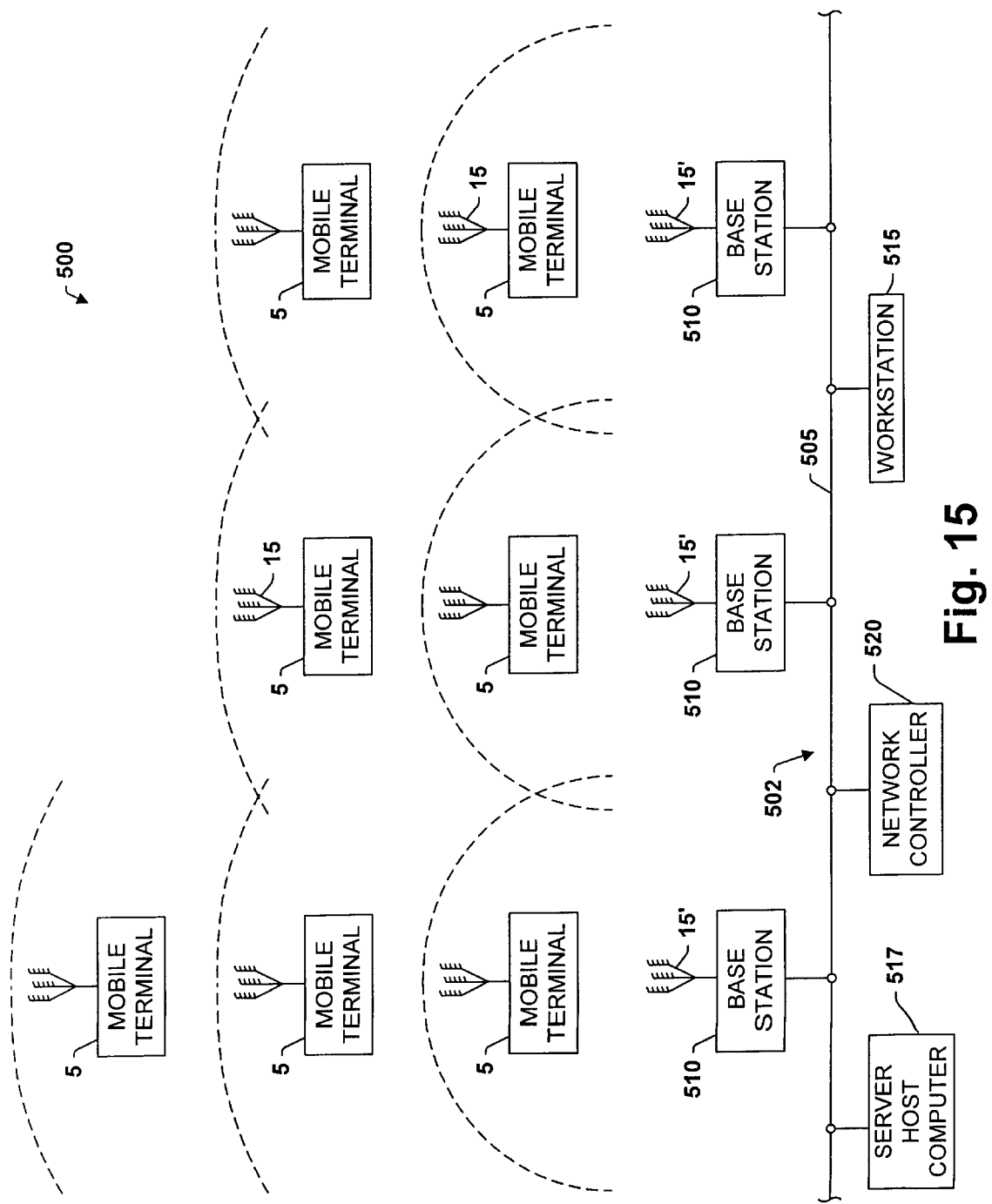
FIG. 15 is a block diagram of a cellular communication system incorporating one or more adjustable radios in accordance with the present invention.

FIG. 15 illustrates an exemplary cellular communication system 500 which includes one or more mobile terminals 5 in accordance with the present invention. The general configuration of the cellular communication system 500 may be any of several known types including a local area network (LAN) or a wide area network (WAN).

The cellular communication system 500 in the exemplary embodiment includes a network 502 which includes a hardwired data communication path 505. The hardwired data communication path 505 may be made of a twisted pair cable, shielded coaxial cable or fiber optic lines, for instance, and is often referred to generally as the system backbone 505. Connected to the system backbone 505 are base stations 510. Each base station 510 wirelessly communicates with other devices in a given cell within the system 500 via an antenna 15'.

The system 500 may also include a client/server network coupled to the system backbone 505, the client/server network including a work station 515, such as an IBM compatible personal computer, and a server (or host computer) 517, such as an IBM RS/6000. A network controller 520 may also be wired to the system backbone 505 to control the flow of data between the base station 510 and other devices wired to the system backbone 505. The network controller 520 may communicate with the devices wired to the system backbone 505 using a variety of protocols, such as the Ethernet or Token Ring protocol.

The cellular communication system 50 also includes one or more mobile terminals 5 of the type described above operating in accordance with the present invention. The mobile terminals 5 can roam from cell to cell using a registration and deregistration process to assure a single entry point to the backbone. Such a registration and deregistration process is described in U.S. Pat. No. 5,276,680 assigned to Telesystems SLW of Ontario, Canada. The mobile terminals 5 may be hand held or vehicle mounted data capturing units, for example.

Figure 16:
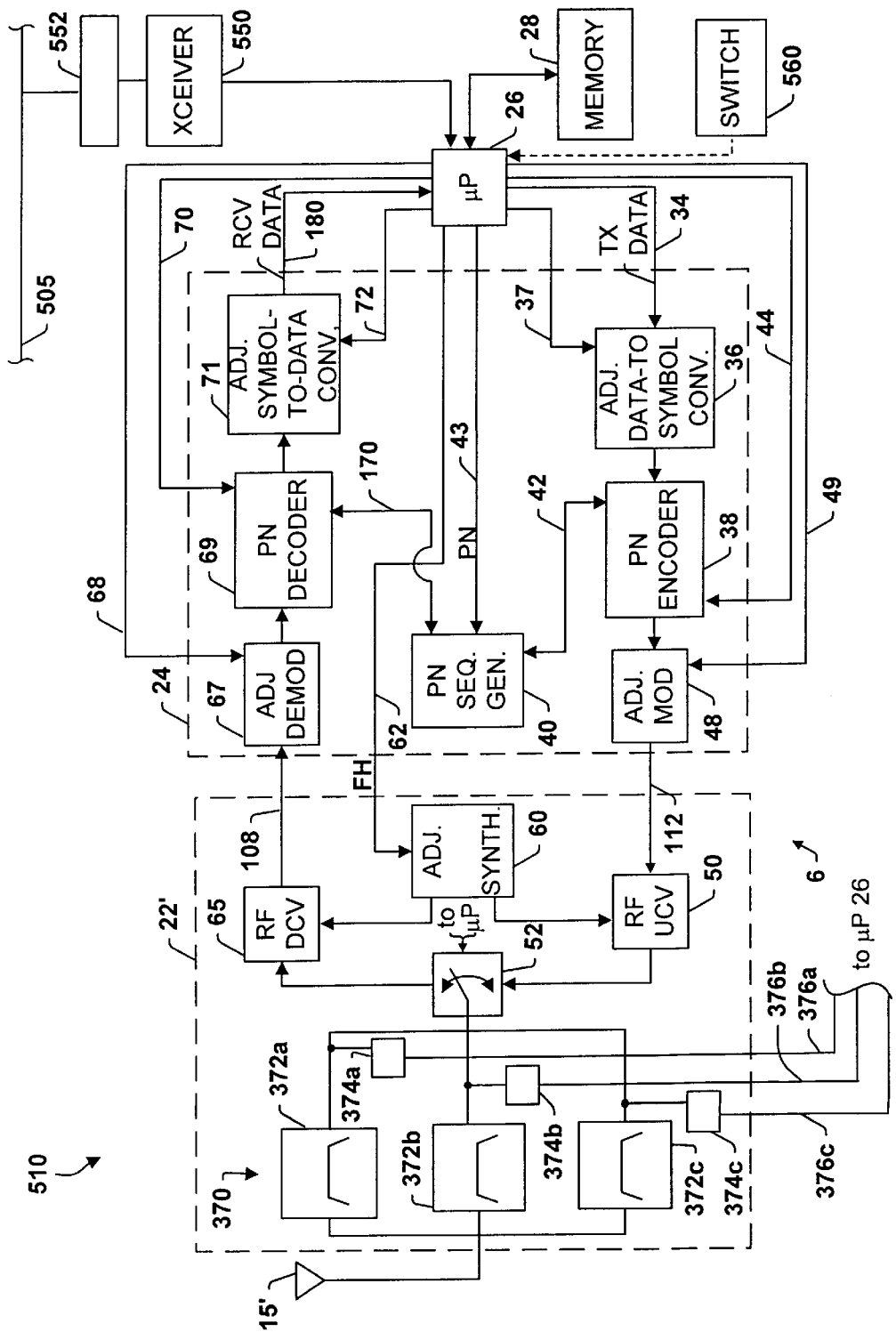
FIG. 16 is a block diagram of a base station with an adjustable radio in accordance with the present invention.

The adjustable radio 6 of the present invention is not limited to use only in mobile terminals. For example, the base stations 510 also may include an adjustable radio 6 similar to that which is included in the mobile terminal as shown in FIG. 16. The base station 510 in this embodiment includes an adjustable radio 6 like that included in the embodiment of the mobile terminal in FIG. 12. The microprocessor 26 in the base station 510 is connected to the system backbone 505 via a conventional network transceiver 550 and network bus connector 552. Information which is to be transmitted to a mobile terminal 5 via the base station 510 is received from the system backbone 505 via the transceiver 550 and is provided to the microprocessor 26. The microprocessor 26 can configure the radio 6 to utilize particular communication parameters identified in the information received from the system backbone 505 in order to transmit such information to a mobile terminal 5 utilizing the same parameters. For example, the information from the system backbone may indicate that such information is to be transmitted according to the parameters of system "ABC Model III" identified in the table 100 stored in memory 28. In turn, the microprocessor 26 adjusts the adjustable modulator 48, PN sequence generator 40, data-to-symbol converter 36, demodulator 67, symbol-to-data converter 71 and synthesizer 60 using the same techniques described above based on the information in the parameter table 100.

According to another embodiment, the base station 510 includes a physical switch 560 the position of which indicates to the microprocessor 26 a desired set of communication parameters stored in the parameter table 100. Based on the particular system identified by the position of the switch 560, the microprocessor 26 accesses the communication parameters from the table 100 and configures the radio 6 to operate in accordance with such parameters.

The base station 510 can receive signals substantially simultaneously from radios using different communication parameters based on the RF section 22' in the same manner described above in relation to the mobile terminal in the embodiment of FIG. 12. In the case of the base station 510, the information in the parameter table 100 can be prestored and/or provided via the system backbone 505 from the network controller 520, a work station 515, etc. The operation of the radio 6 is identical to that described above with the exception that the selection of one or more system communication parameters is initiated via the system backbone 505 rather than a bar code reader, cursor keys, etc.

Although the invention has been shown and described with respect to certain preferred embodiments, it is obvious that equivalents and modifications will occur to others skilled in the art upon the reading and understanding of the specification. For example, each of the above embodiments assumes that the receiver and transmitter portions of the radio are configured to operate according to identical parameters at any given time. It will be appreciated, however, that the radio could also configure the receiver and transmitter portions separately so as to operate using different parameters. The appropriate parameters are of course a function of the design of the particular system in which the radio is utilized.

Furthermore, the radio as described herein is adjusted based on the particular system in which the radio is to be utilized. However, it will be appreciated that the radio may be adjustable for other purposes as well. For example, if an area is particularly noisy each mobile terminal and base station can be configured to use an FH spreading technique. In a less noisy environment, the radios can be reconfigured to utilize a DS spreading technique in order to provide higher data throughput.

The present invention includes all such equivalents and modifications, and is limited only by the scope of the following claims.

What is claimed is:

1. A cellular communication device, comprising:
an adjustable radio which transmits and receives cellular communication radio signals based on selected communication parameters, the adjustable radio including:
an antenna for wirelessly transmitting and receiving the cellular communication radio signals; and
an RF section for sequencing the radio signals according to a set of communication parameters selected from among a plurality of different sets of communication parameters including pseudonoise code sequence frequency hopping sequence, modulation scheme and combinations thereof;
wherein the RF section operates with a clock speed higher than the data rate of the cellular communication radio signals, in order to reconfigure substantially instantly between a plurality of selected sets of communication parameters, so as to transmit and receive communication substantially simultaneously over a plurality of frequency bands.

2. The cellular communication device of claim 1, further comprising a memory for storing the different sets of communication parameters and wherein the different sets of communication parameters relate respectively to different cellular communication systems.

3. The cellular communication device of claim 1, wherein the input comprises a display for displaying indicia of the plurality of different sets of communication parameters.

4. The cellular communication device of claim 1, wherein the device is a mobile terminal.

5. The cellular communication device of claim 1, wherein the device is a base station.

6. The cellular communication device of claim 1, wherein the plurality of frequency bands includes at least two of an 806–870 MHZ range, 902–928 MHZ range, and 2.4–2.48 Ghz range.

7. The cellular communication device of claim 1, wherein the adjustable radio further includes circuitry for monitoring a received signal strength indicator (RSSI) output from each of the plurality of filters.

8. The cellular communication device of claim 7, wherein the circuitry for monitoring is configured to adjust the selected set of communication parameters within the adjustable radio to communicate on the frequency band corresponding to the frequency band associated with the filter outputting the greatest RSSI.

9. The cellular communication device of claim 8, wherein the adjustable radio further includes an adjustable synthesizer for varying a carrier frequency of signals transmitted by the adjustable radio so as to communicate on the plurality of frequency bands.

10. The cellular communication device of claim 1, wherein the adjustable radio includes an adjustable synthesizer for varying a carrier frequency of the cellular communication radio signals transmitted by the adjustable radio to correspond to a selected one of the plurality of frequency bands.

11. The cellular communication device of claim 1, wherein the adjustable radio further comprises an adjustable modulator and an adjustable demodulator.

12. The cellular communication device of claim 1, wherein the adjustable radio further comprises an adjustable PN sequence generator.

13. A cellular communication system, comprising:
a plurality of networks;
a respective host computer coupled to each of the plurality networks:
a plurality of base stations each coupled to a respective network and communicating with the respective host computer, each of the base stations comprising a base station transceiver for transmitting and receiving wireless communications; and
a plurality of mobile terminals each for communicating with at least one of the networks by way of at least one of the respective plurality of base stations, each of the plurality of mobile terminals having a mobile terminal transceiver for transmitting and receiving wireless communications with respect to the at least one of the respective plurality of base stations;
wherein the transceiver of at least one of the mobile terminals or base stations comprises:
an adjustable radio which transmits and receives cellular communication radio signals based on a selected set of communication parameters, the adjustable radio including:
an antenna for wirelessly transmitting and receiving the cellular communication radio signals; and
an RF section for sequencing the radio signals according to set of communication parameters selected from among a plurality of different sets of communication parameters including pseudonoise code sequences, frequency hopping sequence modulation scheme and combinations thereof;
wherein the RF section operates with a clock speed higher than the data rate of the cellular communicated radio signals, in order to reconfigure substantially instantly between a plurality of selected sets of communication parameters, so as to transmit and receive communication substantially simultaneously over a plurality of frequency bands.

* * * * *